United States Patent
Newman

[11] Patent Number: 6,138,726
[45] Date of Patent: Oct. 31, 2000

[54] ROUTER GUIDE MILLING APPARATUS AND METHOD

[76] Inventor: Roger R. Newman, 20 Lytton Blvd., Toronto, Ontario, Canada, M4R 1L1

[21] Appl. No.: 09/207,758

[22] Filed: Dec. 9, 1998

[51] Int. Cl.[7] .................................................... B27M 1/00
[52] U.S. Cl. ............................. 144/371; 33/429; 33/638; 144/144.1; 144/144.51; 144/144.52; 144/372; 409/130
[58] Field of Search ............................. 144/135.2, 135.3, 144/137, 139, 144.52, 253.5, 371, 372; 409/175, 181, 182, 125, 130; 33/DIG. 9, 427, 429, 562, 197, 638

[56] References Cited

U.S. PATENT DOCUMENTS

| | | | |
|---|---|---|---|
| 3,734,151 | 5/1973 | Skripsky | 144/1 R |
| 4,095,633 | 6/1978 | Kimball et al. | 144/144 R |
| 4,215,731 | 8/1980 | Maynard | 144/136 |
| 4,291,735 | 9/1981 | Silken | 144/136 |
| 4,434,824 | 3/1984 | Bussey | 144/134 |
| 4,630,657 | 12/1986 | Obradovich | 144/144.5 |
| 4,753,531 | 6/1988 | Boerckel et al. | 409/182 |
| 5,016,358 | 5/1991 | Rice et al. | 33/569 |
| 5,042,542 | 8/1991 | Purviance | 144/134 A |
| 5,052,454 | 10/1991 | Meinhardt | 144/144.5 R |
| 5,240,052 | 8/1993 | Davison | 144/372 |
| 5,345,986 | 9/1994 | Kieffer | 144/372 |
| 5,375,951 | 12/1994 | Veale | 409/131 |
| 5,458,171 | 10/1995 | Ward | 144/84 |
| 5,533,556 | 7/1996 | Whitney | 144/144.52 |

OTHER PUBLICATIONS

Spielman, P., *The New Router Handbook* (New York: Sterling Publishing Co., 1993) pp. 137, 138 and 154–155.
Spielman, P., *Router Jigs and Techniques* (New York: Sterling Publishing Co., 1988) pp. 203–205.
De Cristoforo, R.J., *The Portable Router Book, 2nd Edition* (Blue Ridge Summit, PA: Tab Books, 1994) pp. 131–136 and 214–218.

*Primary Examiner*—W. Donald Bray
*Attorney, Agent, or Firm*—Bereskin & Parr

[57] ABSTRACT

An apparatus and method for enabling the routing of wide grooves and rabbets onto the sides, edges, or ends of boards, using a hand-held router. The apparatus comprises a main body platform with a pair of fence feet mounted on the underside. The fence feet act as guide fences, supporting feet, or both, to guide the router over the workpiece to obtain the desired cut. Calibration reference points on the main body platform and on the fence feet allow the fence feet to be adjusted quickly and accurately for various widths of grooves and rabbets, and for a number of different router bit sizes. The operating height of the main body platform may be adjusted by adding fence feet soles and spacers onto the bottom of the fence feet.

20 Claims, 21 Drawing Sheets

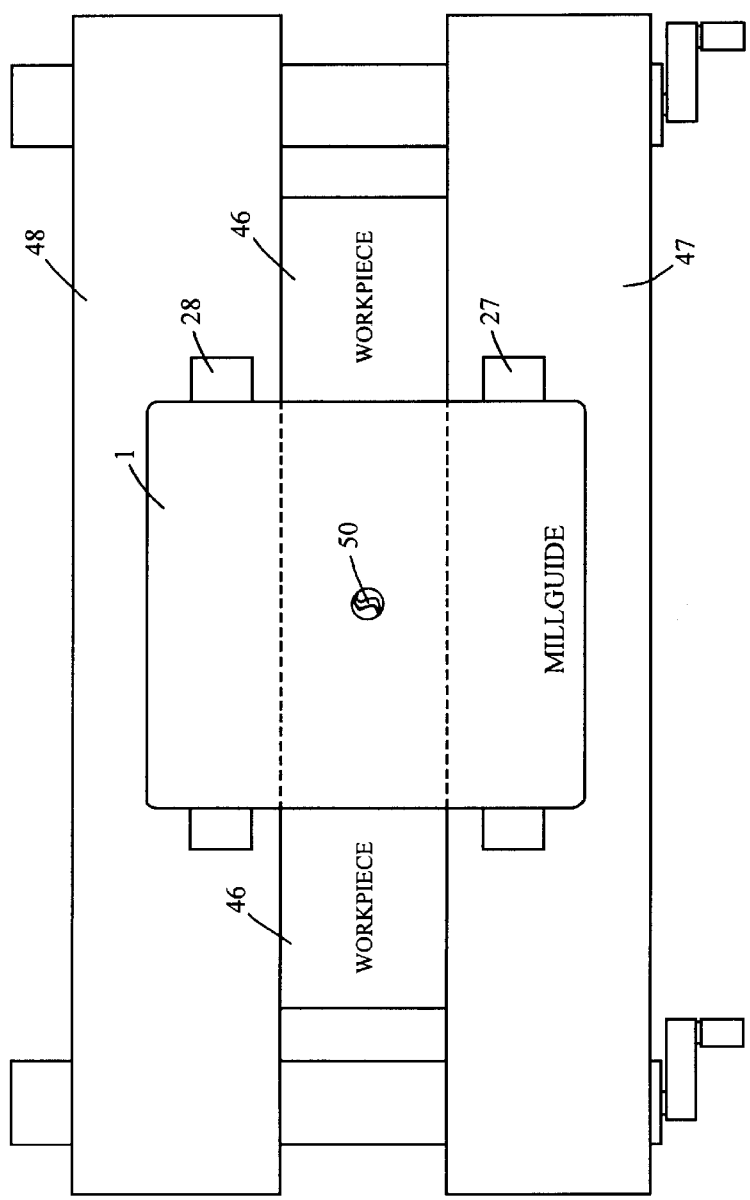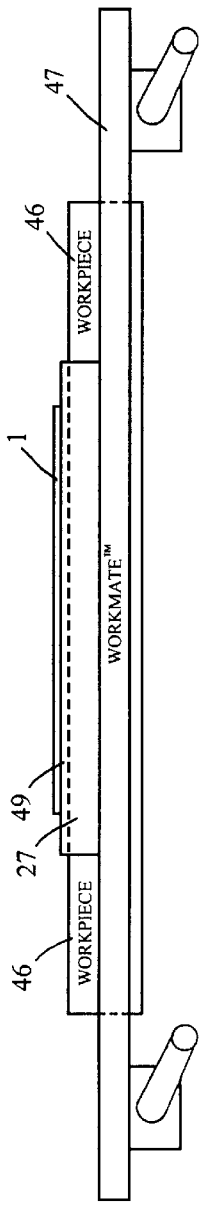

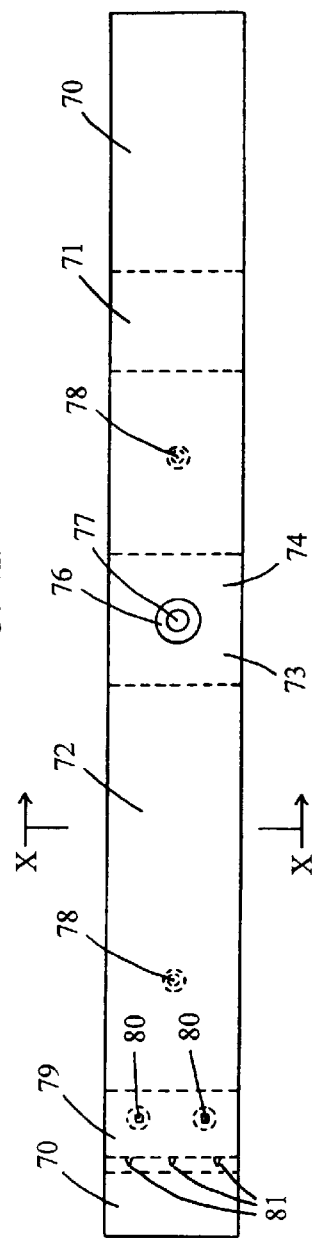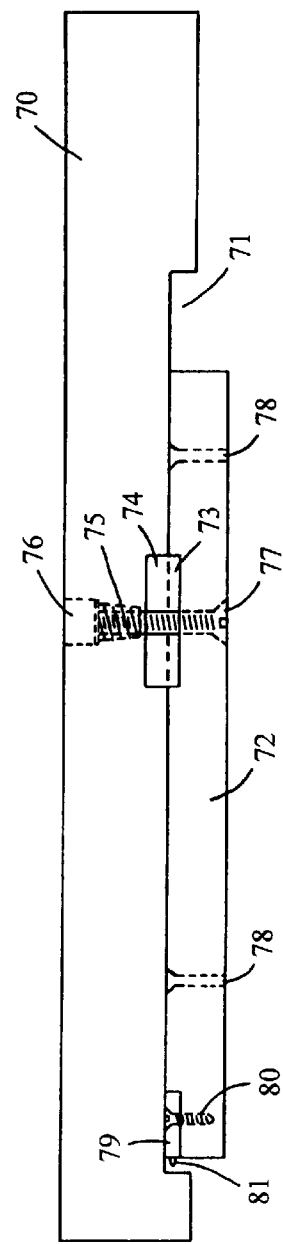

ROUTER GUIDE MILLING APPARATUS AND METHOD

FIELD OF THE INVENTION

This invention relates to a device and method for enabling the routing of wide grooves and rabbets onto the sides, edges, or ends of boards, using a standard hand-held router. Depending on the method used, the rabbets and grooves can be of virtually any length.

BACKGROUND OF THE INVENTION

When routing wide grooves and rabbets onto the sides, edges, or ends of boards, it is desirable to provide an apparatus which readily adjusts to the height of the workpiece and the width of the groove required.

Various designs can be found in the prior art including Spielman, P., *The New Router Handbook* (New York: Sterling Publishing Co., 1993) at pp. 137, 138, and 154–155. As described on p. 137, and shown in illus. 11–7 and 11–8, a pair of edge guides can be attached to the router base and can be used as fences which run along each side of a workpiece. The apparatus shown in illus. 11–7 and 11–8 does not allow the routing of wide grooves or recesses, and essentially enables routing of a groove of the same width as the router bit.

Another design is shown at p. 154, in illus. 12–1. As shown in illus. 12–1, a hand-held router is mounted onto a board having two adjustable side fences mounted into parallel slots on either side. The side fences butt up against two fixed and level router guide rails which contain a board to be planed by a router, as shown in illus. 12–3. While this design allows wide grooves or recesses to be routed into a workpiece, two fixed and level guide rails are required, and the adjustable guide fences on either side cannot be readily set to rout a groove having a particular width.

Another design is disclosed in Spielman, P., *Router Jigs and Techniques* (New York: Sterling Publishing Co., 1988) at pp. 203–205. In illus. 438–441, a hand-held router is shown with parallel runners attached to the base of the router. These runners act to suspend the hand-held router above a workpiece and cannot be adjusted laterally. Consequently, this design cannot be used to form grooves having various width. A variation of this design, shown in illus. 443–445, also cannot be used for this purpose, particularly because the U-shape of the one piece runner will not allow the router to be moved along the length of a workpiece, and these designs are essentially intended for planing operations of wood plugs or pegs.

Other designs are shown in De Cristoforo, R. J., *The Portable Router Book*, 2nd Edition (Blue Ridge Summit, PA: TAB Books, 1994) at pp. 131–136 and 214–218. As described on pp. 131–133, and as illustrated in FIGS. 9–20 and 9–22, a special router sub-base is shown having adjustable guide fences attached on either side. This design potentially allows a hand-held router to be used to rout wide grooves or slots. However, this special router sub-base must be supported on two level rails which clamp a workpiece between them. Consequently, the width of the groove or slot being cut will be limited by the rails on either side of the workpiece, as shown in FIGS. 9–21. Furthermore, as shown in FIGS. 9–23, on p. 134, the guides on the sub-base are designed to be set so that both guides are guided along the outside of the clamping rails. A somewhat different design, allowing grooves to be automatically centered in the workpiece, is shown in FIGS. 9–26, and demonstrated in FIGS. 9–27 and 9–28. By a pivoting action of the router base, the attached rails are twisted into a parallelogram shape which hugs the workpiece as shown. While this design is useful for centering a groove in a workpiece, it is not suitable for routing wide grooves or recesses of various width.

Finally, L-shaped tracks are disclosed in FIGS. 11–19 for levelling the top of a number of slabs which have been glued together. However, the L-shaped tracks are connected at each end by track connectors, which rest and slide along bearing strips located on each side of the workpiece. Consequently, the width of the L-shaped tracks are not adjustable.

SUMMARY OF THE INVENTION

The present invention provides an apparatus for use with a router, said router having a baseplate and a router bit extending downwardly from said baseplate for routing a workpiece, said apparatus comprising:

(a) a main body platform having location means for receiving and locating the router baseplate therein, said main body platform having a centrally located access hole for the router bit and opposite side edges;

(b) a pair of fence feet located on the underside of said main body platform on either side of the access hole and substantially parallel to one another, said pair of fence feet providing opposing inside surfaces for limiting lateral movement of said main body platform relative to the work piece, each of the fence feet having first and second ends extending beyond the opposite side edges of the body platform and including first and second surface areas viewable from above;

(c) calibration reference points on at least one of the first and second surface areas thereon;

(d) mounting and securing means slidably mounting the fence feet to the main body platform for movement in a direction generally perpendicular to the fence feet and enabling the fence feet to be secured to the main body platform; and (e) calibration markings marked on said main body platform along the opposite side edges for use in conjunction with the calibration reference points, wherein the calibration reference points enable an allowance to be made for the diameter of a router bit.

Preferably, the mounting and securing means comprises, for each fence foot, a pair of elongate slots in the main body platform and a pair of screw knobs each having a screw shaft extending through one of the slots and engaging the fence foot.

More preferably, the main body platform includes a pair of substantially parallel fence feet adjustment bars mounted parallel to and set in from the opposite side edges thereof, with the elongate slots being provided in the fence foot adjustment bars.

Advantageously, the apparatus further includes pairs of height-extending fence feet soles for incrementally raising the overall height of the fence feet for spacing the main body platform at a greater height above a benchtop, and optionally including pairs of spacers for further increasing the height of the fence feet.

In another aspect, the present invention provides a method of routing a surface of a workpiece with a router having a baseplate and a router bit extending downwardly from the baseplate, the method comprising:

(1) providing an apparatus comprising:
(a) a main body platform having location means for receiving and locating the router baseplate therein, said main body platform having a centrally located access hole for the router bit and opposite side edges;
(b) a pair of fence feet located on the underside of the main body platform on either side of the access hole and substantially parallel to one another; and
(c) mounting and securing means slidably mounting the fence feet to the main body platform for movement in the direction generally perpendicular to the fence feet and enabling the fence feet to be secured to the main body platform;

(2) mounting a router to the main body platform, and adjusting and securing the fence feet in desired positions;

(3) mounting the workpiece onto a workbench;

(4) supporting the router by the fence feet on the workbench; and (5) operating the router and traversing the router and the apparatus across the workbench to rout the workpiece.

In one preferred embodiment, in the method claimed, the fence feet are set far enough apart to permit the whole surface of the workpiece to be covered by the router, and the router is operated to effect a planing operation on the top surface of the workpiece.

In a preferred variant, the fence feet are adjusted to a desired spacing, and the router is operated to effect one of cutting a groove and cutting a rabbet on the workpiece.

In another aspect, the present invention provides a method of routing a surface of a workpiece, having generally parallel and uniformly spaced sides, with a router having a baseplate and a router bit extending downwardly from the baseplate, the method comprising:

(1) providing an apparatus comprising:
  (a) a main body platform having location means for receiving and locating the router baseplate therein, said main body platform having a centrally located access hole for the router bit and opposite side edges;
  (b) a pair of fence feet located on the underside of the main body platform on either side of the access hole and substantially parallel to one another; and
  (c) mounting and securing means slidably mounting the fence feet to the main body platform for movement in the direction generally perpendicular to the fence feet and enabling the fence feet to be secured to the main body platform;

(2) mounting a router to the main body platform;

(3) adjusting the fence feet relative to the width of the workpiece between the sides thereof so that the spacing between an inside surface of each fence foot and the most distant edge of the router bit is less than the width of the workpiece, to maintain the router bit on the workpiece; and (4) mounting the apparatus on the workpiece, operating the router and traversing the router across the workpiece, as limited by the fence feet, to cut a groove in the workpiece.

Further aspects of the invention will be apparent from the following description, taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention and in which:

FIGS. 13 and 14 show a corresponding top view and front view, respectively, of the setup shown in FIG. 12;

FIGS. 42–44 show a top view, side view, and end view, respectively, of the end holding clamp unit in folded position, as shown in FIG. 35B;

FIG. 45 shows a cross-sectional end view of the end holding clamp unit in folded position along the line X—X as indicated in FIG. 42.

DETAILED DESCRIPTION OF THE INVENTION

For the purposes of this disclosure, the apparatus comprising a working platform and a pair of fence feet is generally referred to as the "millguide".

Figure 1:
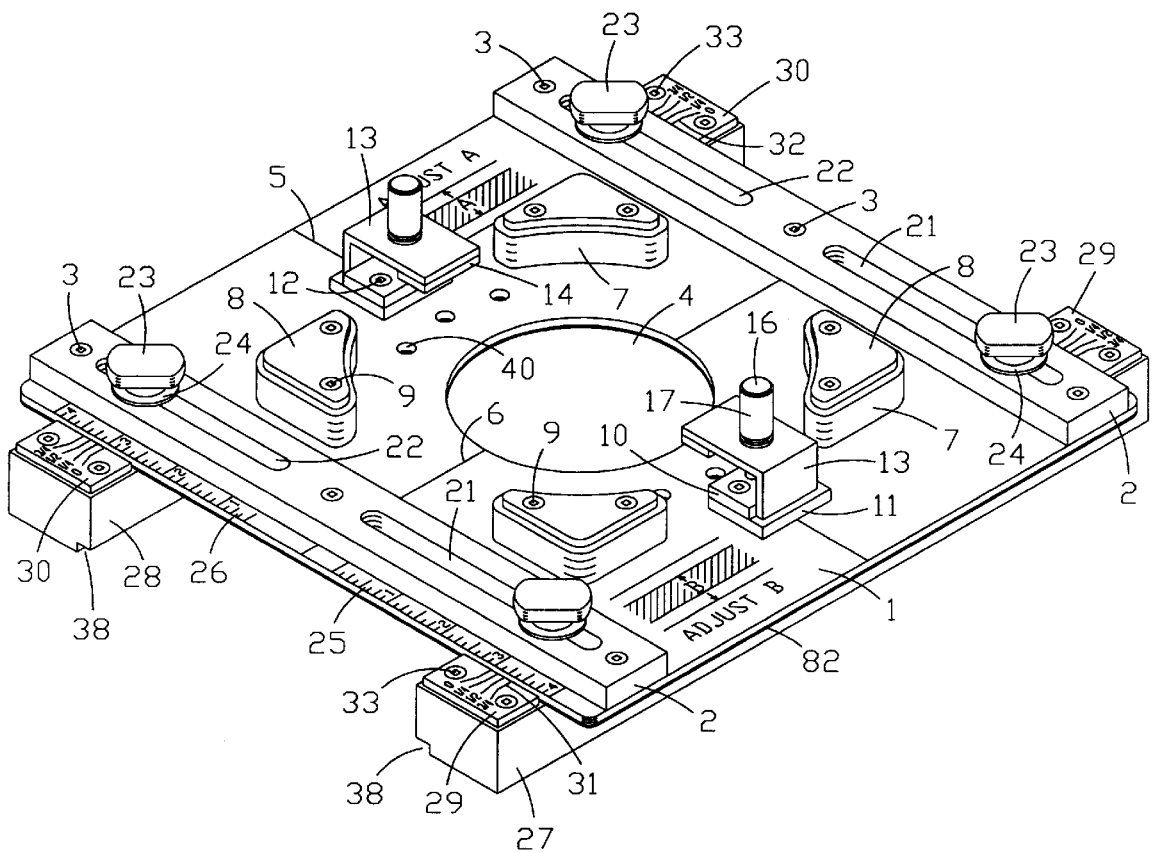
FIG. 1 shows an isometric view of the apparatus.
Figure 2:
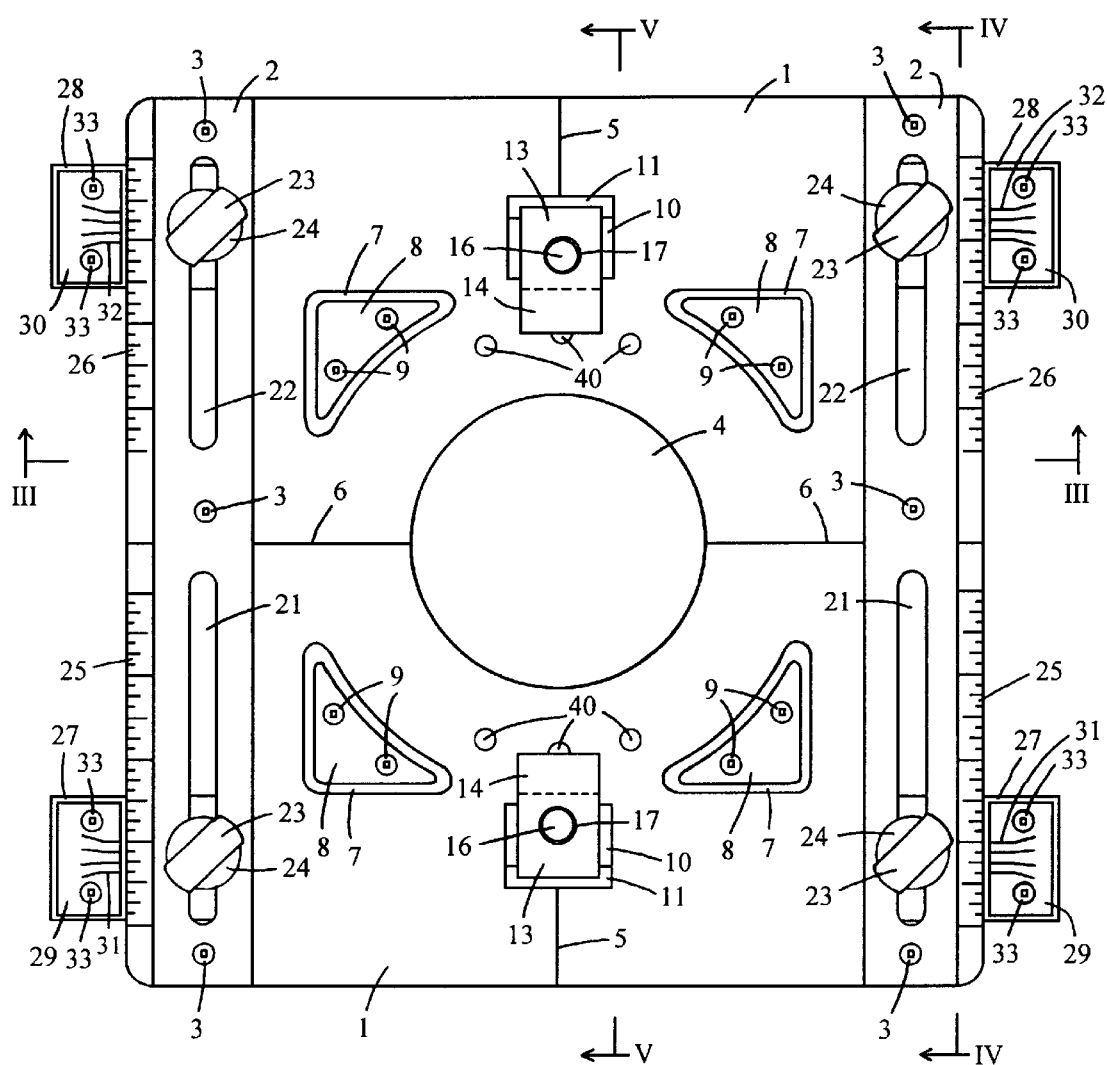
FIG. 2 shows a corresponding top view of the apparatus.

Referring to FIGS. 1 and 2, the apparatus or millguide has a main body platform 1 having an opening 4 at its center. Located near each end of the main body platform 1 are fence foot adjustment bars 2, which are fastened onto the main body platform 1 by means of flat-headed machine screws 3. Each fence foot adjustment bar 2 has two long slots 21 and 22 cut into it. The long slots 21, 22 extend into the main body platform 1. Located underneath the main body platform 1 are front and rear fence feet 27, 28 which extend beyond each end of the main body platform 1. Calibration reference plates 29, 30 are fastened onto the upper surface at both ends of the front and rear fence feet 27, 28 by means of flat-headed wood screws 33.

Figure 3:
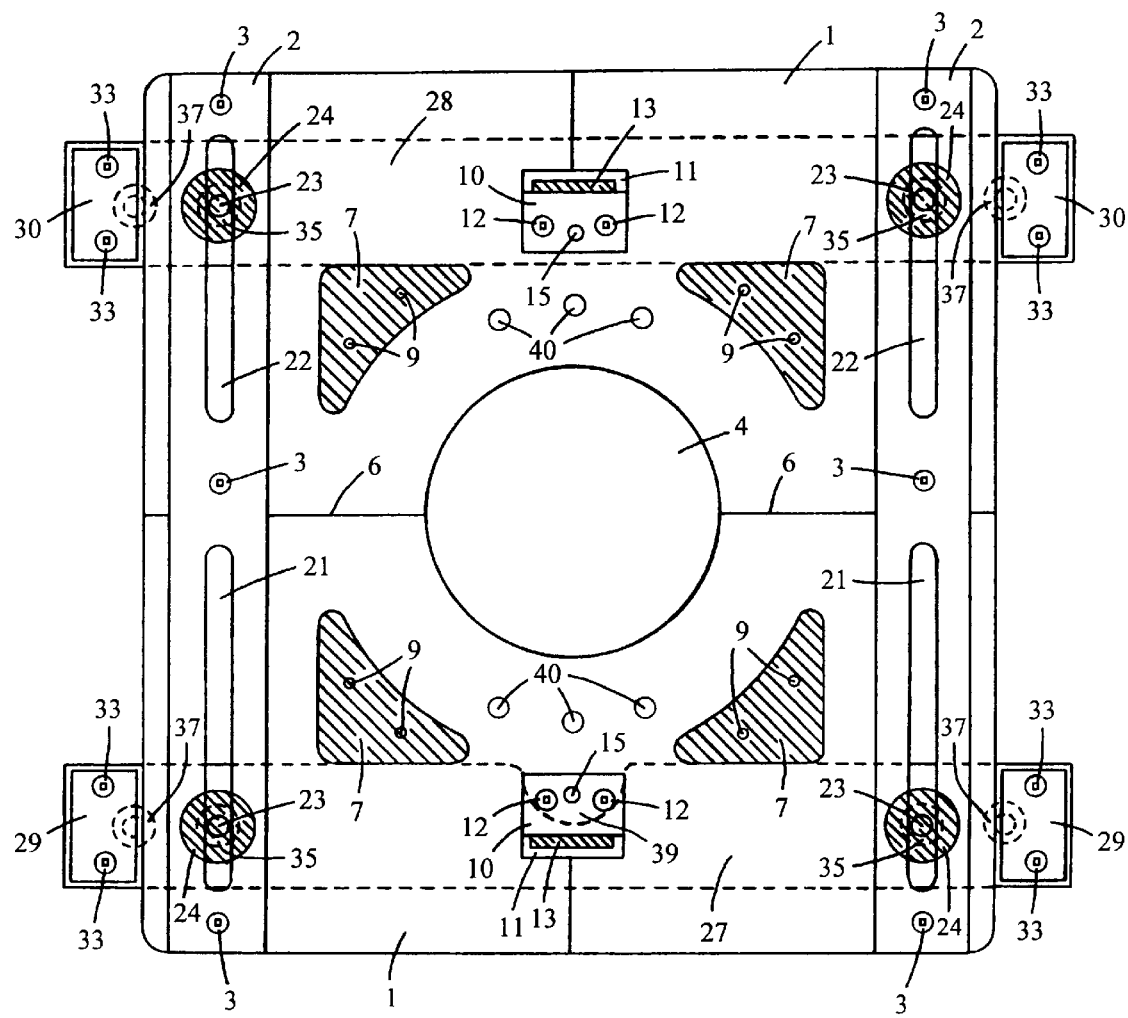
FIG. 3 shows a cross-sectional top view taken along the line II—II indicated in FIG. 4.
Figure 5:
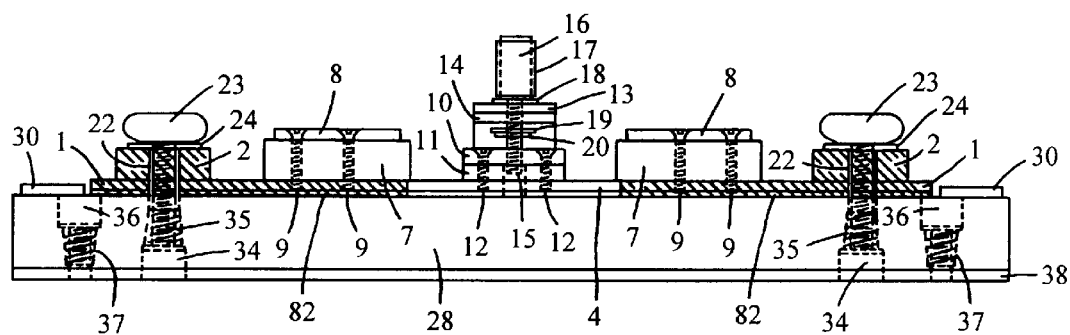
FIG. 5 shows a cross-sectional front view taken along the line III—III indicated in FIG. 2.
Figure 7:
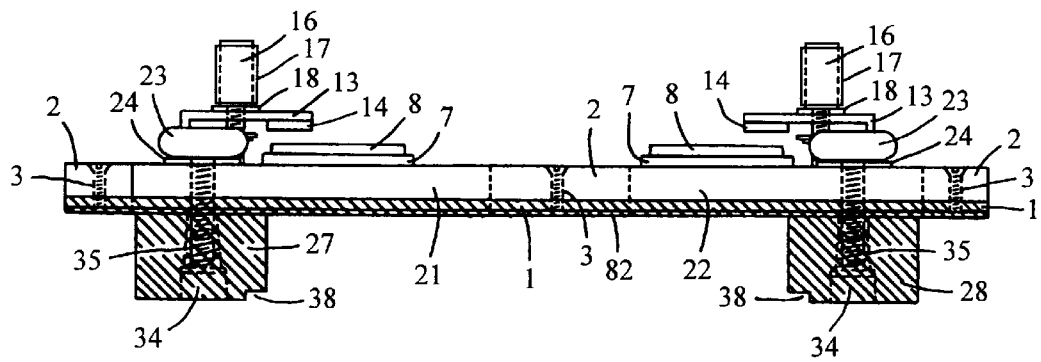
FIG. 7 shows a cross-sectional end view of the apparatus taken along the line IV—IV indicated in FIG. 2.

Now referring to FIGS. 3, 5 and 7, situated in deep recesses 34 on the bottom at each end of both fence feet 27, 28 are flanged threaded metal inserts 35. Screw knobs 23 located in each of the long slots 21, 22 are screwed into the flanged threaded metal inserts 35, and fasten the front and rear fence feet 27, 28 onto the main body platform 1. As shown in FIG. 5, situated in deep recesses 36 on the top, at each end of both fence feet 27, 28 are flanged threaded metal inserts 37, which are used for the attachment of fence feet soles which are described further below.

Figure 4:
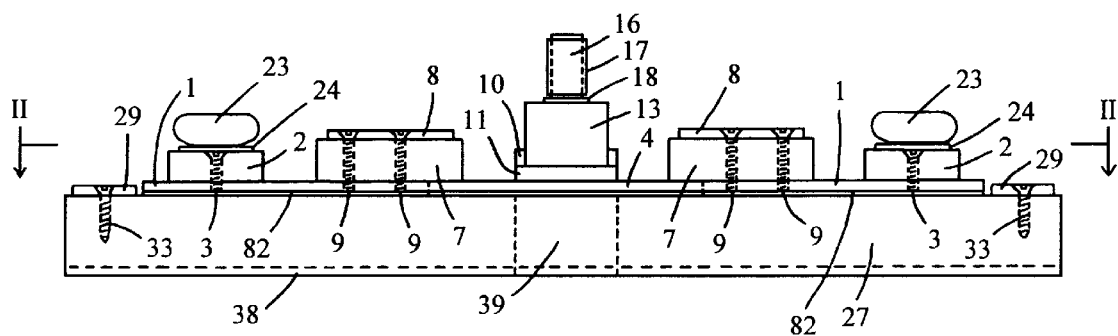
FIG. 4 shows a front view of the apparatus shown in FIG. 1.
Figure 6:
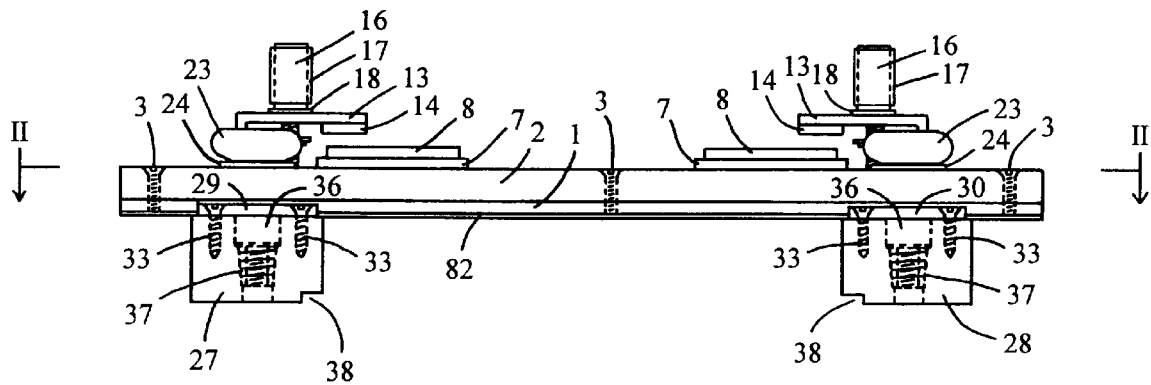
FIG. 6 shows an end view of the apparatus shown in FIG. 2.

Now referring to FIGS. 4 and 6, the lower forward edges of the front and rear fence feet 27, 28 are shown with rabbets 38. The rabbets 38 minimize any problems resulting from swarf buildup during use.

Referring back to FIGS. 1–3, equally spaced around the large circular hole 4 are four curve-shaped holding blocks 7, each of which is fastened down to the main body platform 1 by means of two flat-headed machine screws 9 in conjunction with a curve-shaped metal plate 8. The clearance holes in each curve-shape holding block 7 allow a limited amount of adjustment so that the curve-shaped holding blocks can fit snugly, but not tightly, against the perimeter of the base plate of a hand-held router when it is placed onto the top surface of the main body platform 1.

Figure 8:
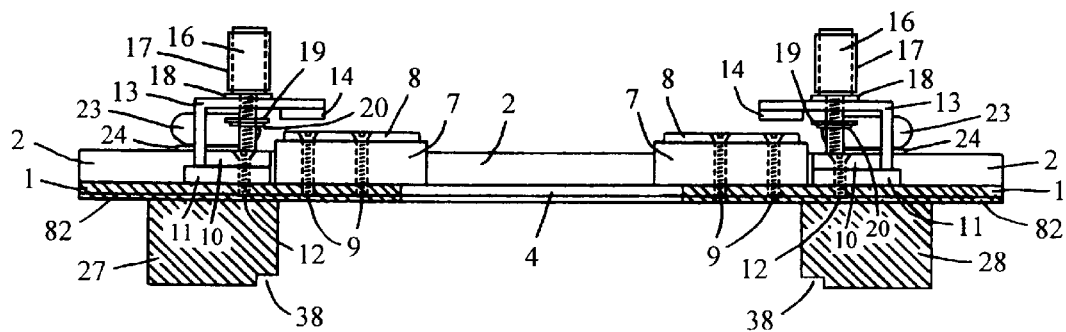
FIG. 8 shows a cross-sectional end view taken along the line V—V indicated in FIG. 2.

Now referring to FIGS. 5 and 8, at the front and rear of the main body platform 1 are two holding clamps each consisting of a right-angled bracket 13 through which a threaded rod 15, joined to a knob 16, passes. The threaded rod 15 is held in place by washers 18, 19 and also by circlip 20. The knob 16 and the threaded rod 15 are free to rotate, but are loosely held captive to the right-angled bracket 13.

Tight fitting rubber tubing 17 is fitted over the outside of both holding clamp knobs 16 for better grip. Rubber pads 14 are glued onto the forward undersides of both right-angled brackets 13 to cushion the contact between the holding clamps and the base of a hand-held router. The threaded rod 15 is screwed into a tapped hole through each clamp attachment plate 10, which is located over a clearance hole in each spacer plate 11 as well as in the main body platform 1. The back end of each right-angled bracket 13 rests on a spacer plate 11, and butts against the back edge of each clamp attachment plate 10. This prevents the holding clamp from turning during installation or removal. Each clamp attachment plate 10 and spacer plate 11 is fastened onto the main body platform 1 by means of two flat-headed machine screws 12.

Referring back to FIG. 2, reference lines 5, 6 indicate where the central axis of the router bit would be when a standard hand-held router is installed onto the main body platform 1. Both fence feet 27, 28 are adjustable and can be set at any position by tightening screw knobs 23 for each fence foot. The rear fence foot 28 can be adjusted forward towards the reference line 6 until the rear fence foot 28 almost reaches the router bit region of the router. The front slots 21 are longer than the rear slots 22 so that the front fence foot 27 can be adjusted towards the reference line 6 until the front fence foot 27 is well within the router bit region of the router. This will enable the front fence foot 27 to be set so that the central axis of the router bit can be slightly in front of the workpiece, if desired. This is possible because the front fence foot 27 has a notch 39 on its forward side (shown in FIG. 3) to provide clearance for the router bit when the front fence foot 27 has been set to its fully forward position. This is an important feature, since, unlike the prior art, it enables the routing of a groove extending to the edge of the workpiece.

Calibrations 25, 26 are provided along both ends of the millguide so that the front and rear fence feet 27, 28 can be set at any position, easily and precisely. Calibration reference points 31, 32 are marked on each of the calibration reference plates 29, 30 as shown in FIGS. 1 and 2. This enables the fence feet 27, 28 to be set directly when using various blade diameters in the router. The main body platform 1 has a layer of hard plastic 82 glued onto its underside so that it will slide easily on a workpiece when necessary.

As shown in FIGS. 1–3, six holes 40 in the main body platform 1 accommodate locating lugs in the base plate of the router, which will prevent any rotation of the router within the four curve-shaped holding blocks 7 during use. A small modification will be necessary to the router base plate to install locating lugs, as described below.

Figure 9:
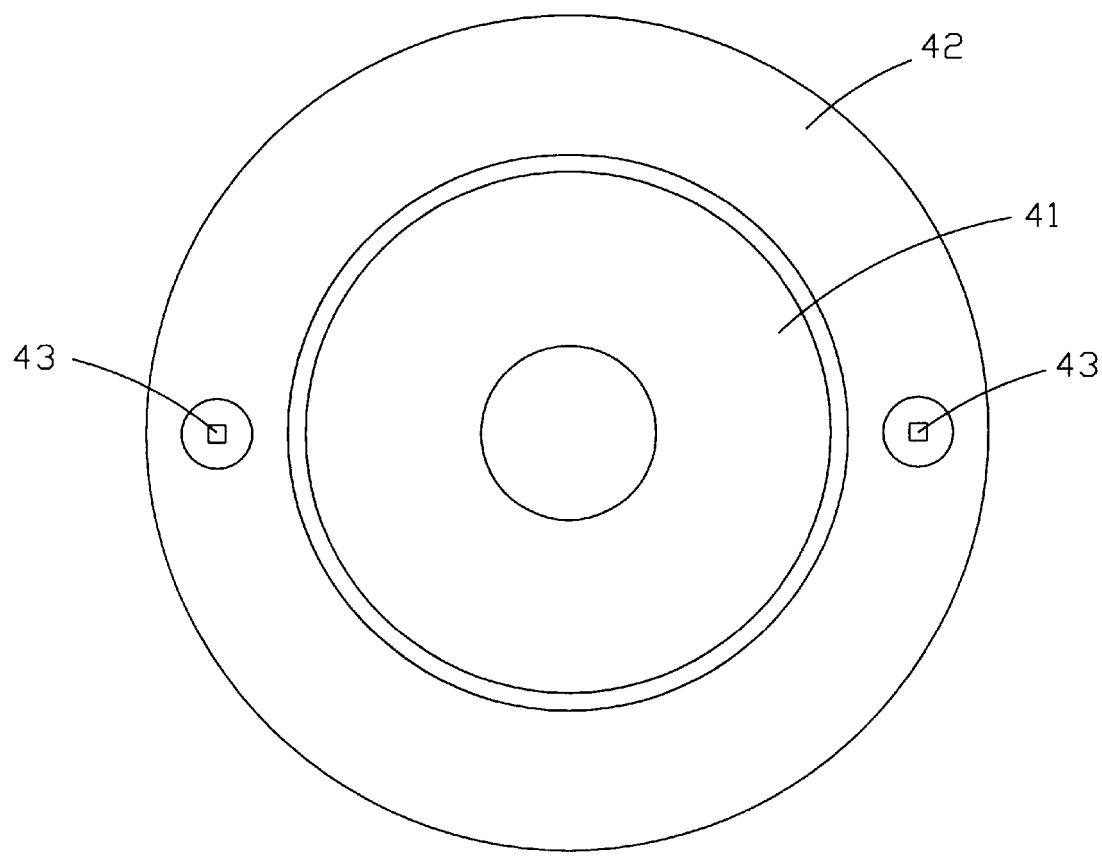
FIG. 9 shows a top view of a router with locating lugs in the router base.
Figure 10:
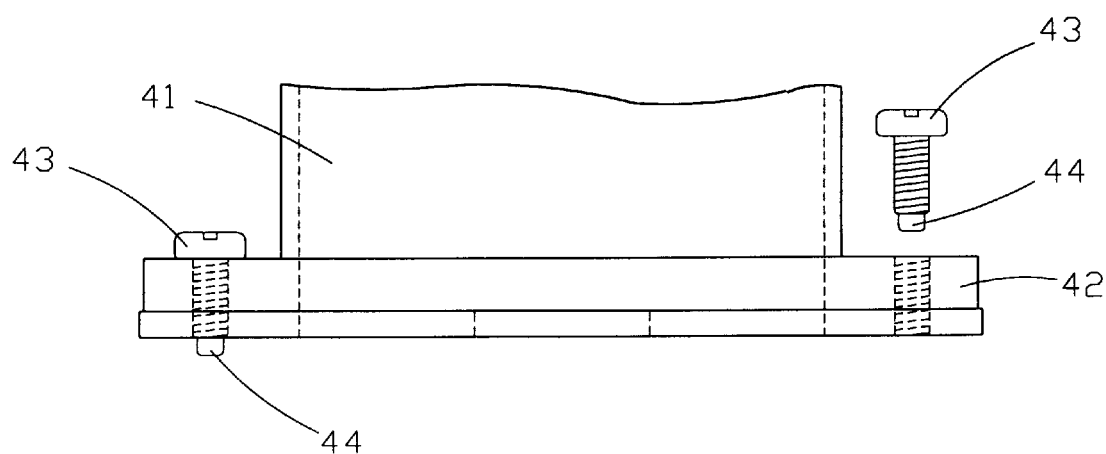
FIG. 10 shows a corresponding front view of the router with locating lugs shown in FIG. 9.

Referring to FIGS. 9 and 10, the router 41 requires two holes to be drilled into its base plate 42. These holes, which are drilled on opposite sides of the router 41 should be located about ½" in from the outside perimeter of the base plate 42, and then tapped with ¼" diameter threads. If it is not possible to drill both holes, having only one tapped hole would suffice. Locating lugs 43 can then be installed into the threaded holes in the router base plate 42 when required. A removable locating lug 43 is essentially a round-headed ¼" diameter stove bolt, of suitable length, which has been machined so that when it is fully screwed into a threaded hole in the router base plate 42, it will cause a small ³⁄₁₆" diameter chamfered pin 44 to protrude ⅛" below the bottom surface of the router base plate 42. Alternatively, locating lugs could instead be fastened onto the main body platform 1, which would then fit into matching holes drilled into the router baseplate 42.

Figure 11:
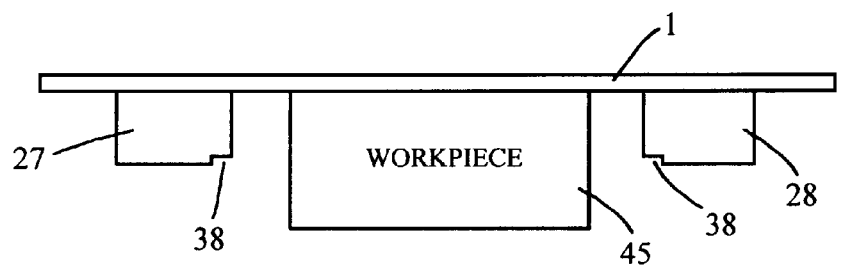
FIG. 11 shows the apparatus being used directly on a workpiece.

Advantageously, the millguide can be operated in four different modes. In a first mode, the main body platform 1 rests directly on a workpiece 45 as shown in FIG. 11. The surface of the workpiece 45 acts as a reference for the millguide, and the fence feet 27, 28 are used as fences only.

Figure 12:
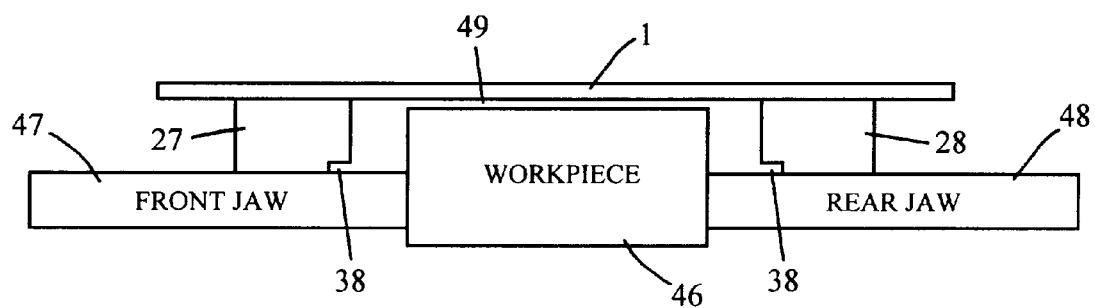
FIG. 12 shows the apparatus used in conjunction with a portable workbench having front and rear jaws.

In a second mode, the millguide operates in conjunction with a portable workbench, such as a Black & Decker Workmate™, as shown in FIGS. 12–14. In this mode, there is no direct contact between the main body platform 1 and the workpiece 46, and a minimum amount of clearance 49 should exist between them. The workpiece 46 is clamped at an appropriate height between the jaws 47 and 48 of the Workmate™ portable workbench. Also, the top surfaces of the Workmate™ jaws 47, 48 act as the reference for the millguide. In this mode, the fence feet 27, 28 operate as feet only, or as fences and feet.

Figure 32:
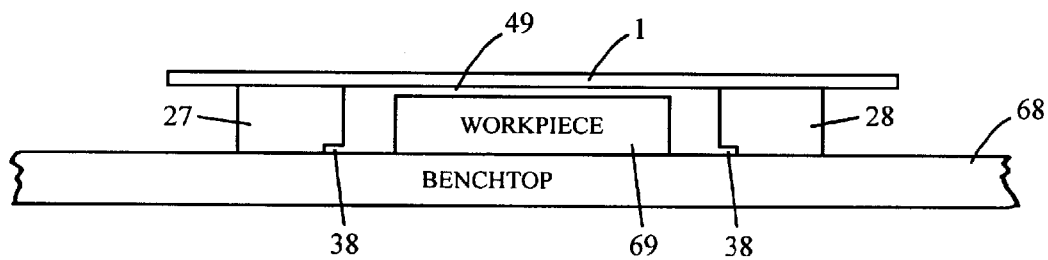
FIGS. 32–34 show an end view of the apparatus with the fence feet only, with soles and spacers attached to the fence feet, and with the soles only, respectively.
Figure 33:
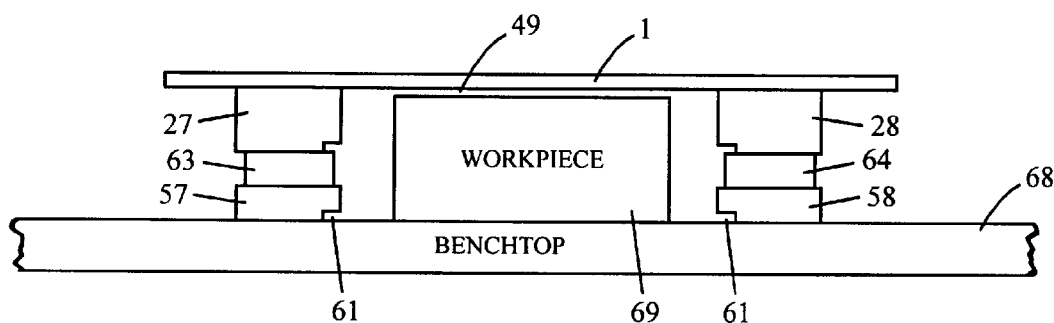

In a third mode, the workpiece 69 is fastened down in some way onto a benchtop 68, as shown in FIG. 32. Special holding clamp units which can be used for this purpose are described further below. In this mode, the fence feet 27, 28 can be used as feet only, or as fences and feet, with the upper surface of the benchtop 68 acting as a reference for the millguide. A minimum amount of clearance 49 should exist between the main body platform 1 and the workpiece 69.

In a fourth mode (not shown), both of the fence feet 27, 28 are removed completely, and the main body platform 1 can be used as a large sized base plate for the router, which may be useful for spanning large recessed areas on a workpiece. The operation of the millguide in each of these four modes is described in greater detail below.

Figure 15:
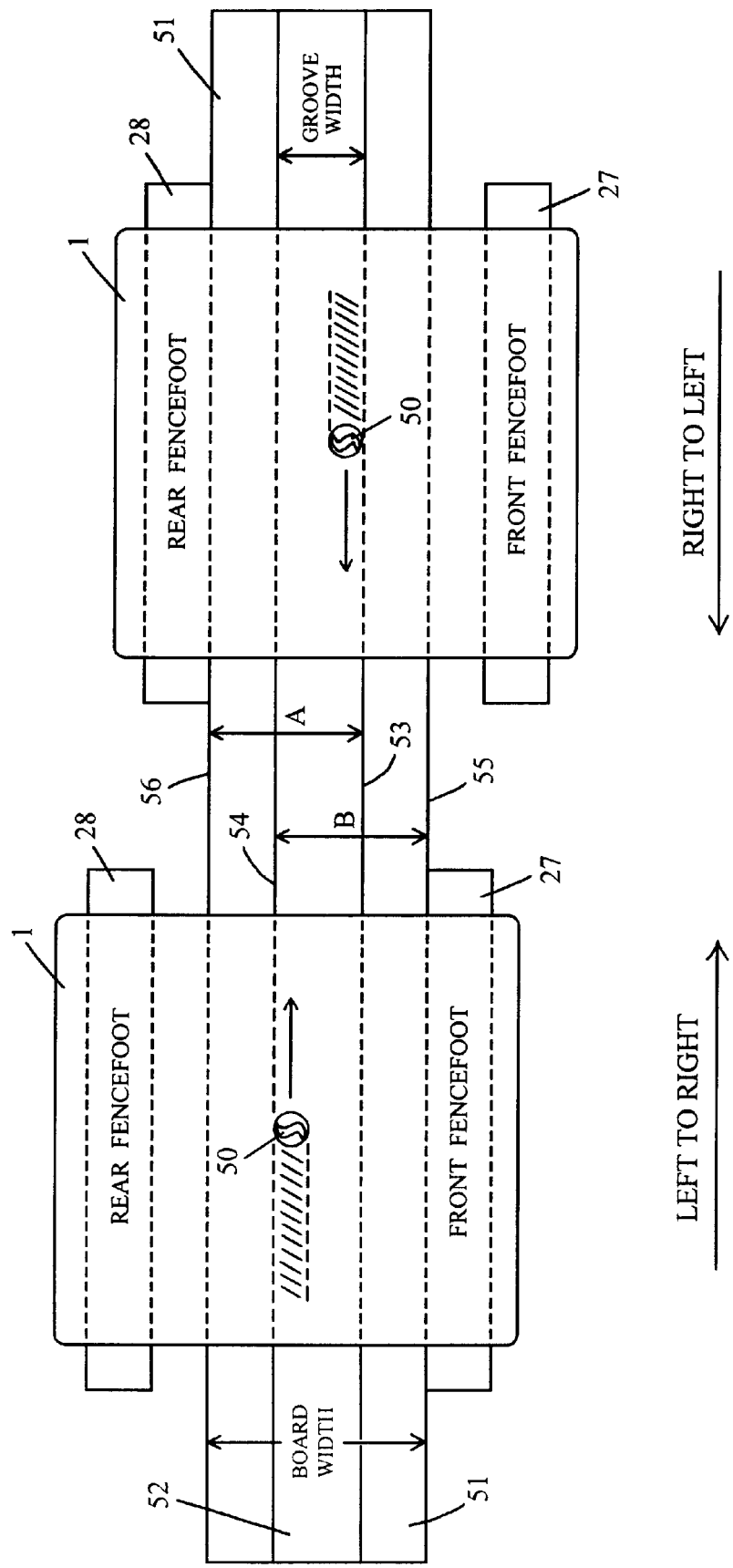
FIG. 15 illustrates the principle of operation of the apparatus.
Figure 16:
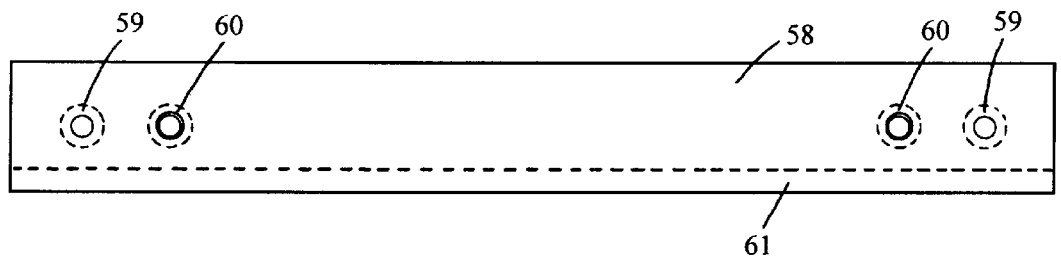
FIGS. 16 and 17 show a top view and front view, respectively, of fence feet soles.
Figure 17:
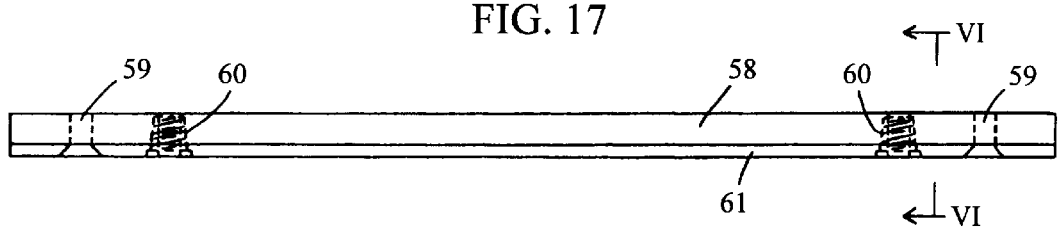

Now referring to FIG. 15, the principle of operation of the millguide is illustrated, showing the routing of a wide groove 52 into a workpiece 51 as an example. Dimension A is the distance between the front edge 53 of the proposed groove 52, and the rear edge 56 of the workpiece 51. This distance is determined by the set position of the rear fence foot 28. Dimension B is the distance between the rear edge 54 of the proposed groove 52, and the front edge 55 of the workpiece 51. This distance is determined by the set position of the front fence foot 27. As shown in FIG. 15, the rear edge 54 of the proposed groove 52 is routed by router bit 50 when the millguide is moved from left to right, with the front fence foot 27 sliding along the front edge 55 of the workpiece 51. The front edge 53 of the proposed groove 52 is routed by router bit 50 when the millguide is moved from right to left, with the rear fence foot 28 sliding along the rear edge 56 of the workpiece 51. Any remaining material that is left in the milling area of the proposed groove 52 can then be routed in a random manner. The actual width of the proposed groove 52 will therefore be determined by the set positions of the front and rear fence feet 27, 28.

When the millguide is operated in the first mode, as described earlier, the millguide uses the top surface of the workpiece itself as a reference. If a wide rabbet is to be routed along the front edge of a workpiece in this mode, the wide rabbet should be initially regarded as if it were to be a wide groove along the front edge of the workpiece. In this case, the front fence foot is adjusted to set the B dimension, which is the distance between the rear edge of the proposed rabbet and the front edge of the workpiece. The rear fence foot, however, is adjusted so that the A dimension is set to be ⅛" less than the full width of the workpiece being rabbeted. This will produce a temporary ⅛" wide wall along the front edge of the proposed rabbet. The temporary wall will act to provide the outer reference for the millguide during routing, thus ensuring an accurate rabbet on the workpiece. The temporary ⅛" wide wall can easily be removed afterwards by using a hand plane, for example.

When using the millguide to router-plane a workpiece in the first mode, two temporary ⅛" wide reference walls will be required—one at the front edge, and one at the rear edge. This means that the front and rear fence feet will have to be adjusted so that both the A and B dimensions will each be set ⅛" less than the full width of the workpiece being router-planed. If there is any warping in the original workpiece, since the millguide uses the original top surface of the workpiece for its reference, that same warp will occur on any router-planed area. However, the warping can be removed from the router-planed area by using the following procedure: After the initial router-planing has been done, the two temporary ⅛" wide walls can be easily corrected using a hand plane. Any subsequent router-planing will then be referenced to those corrected temporary ⅛" wide walls, and the final router-planed area will be warp free. After the router-planing is completed, the two temporary ⅛" wide reference walls can be removed from the workpiece by means of a hand plane.

Referring back to FIG. 1, the millguide fence feet 27, 28 normally have a thickness of 1", and therefore, when they are used as feet only, or as fences and feet, the underside of the main body platform 1 will have an operational height of 1" above any reference surface. This 1" operational height may not always be convenient, since the workpieces will be of various thicknesses. This can be compensated for to some extent, as illustrated in FIG. 12, by raising or lowering the workpiece between the jaws 47, 48 of a portable workbench. However, no height compensation is possible when the workpiece is mounted directly onto a workbench, as illustrated in FIG. 32. For these instances, a set of fence feet soles and spacers can be used to vary the operational height of the main body platform 1 in incremental steps, as explained below.

Figure 19:
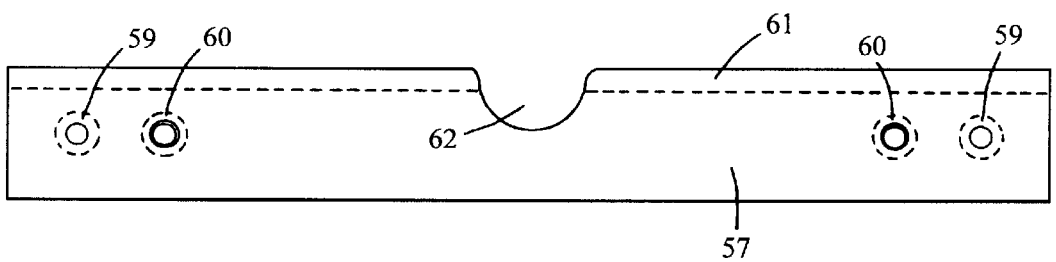
FIGS. 19 and 20 show a top and front view, respectively, of a fence foot sole variant.
Figure 20:
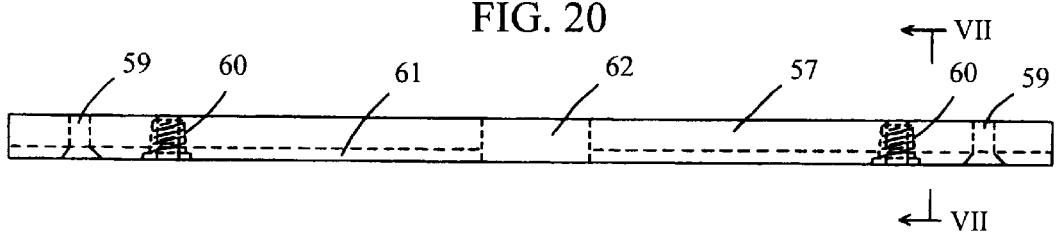
Figure 18A:
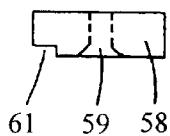
FIG. 18A shows a corresponding end view of the fence foot sole shown in FIG. 16.
Figure 18B:
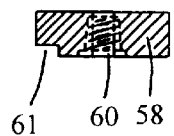
FIG. 18B shows a cross-sectional end view of the fence foot sole taken along the line VI—VI indicated in FIG. 17.
Figure 21A:
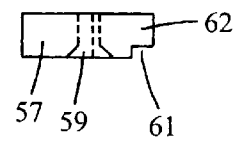
FIG. 21A shows an end view corresponding to the fence foot sole variant shown in FIGS. 19 and 20.
Figure 21B:
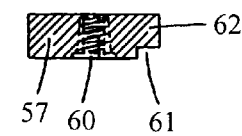
FIG. 21B shows a cross-sectional end view of the fence foot sole variant taken along the line VII—VII indicated in FIG. 20.
Figure 22:
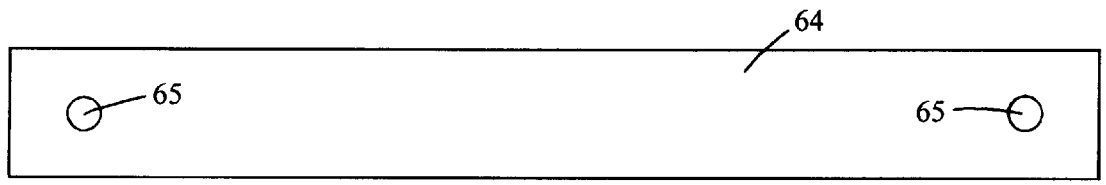
FIGS. 22, 23 and 24 show a top view, front view, and end view, respectively, of fence feet spacers.
Figure 23:
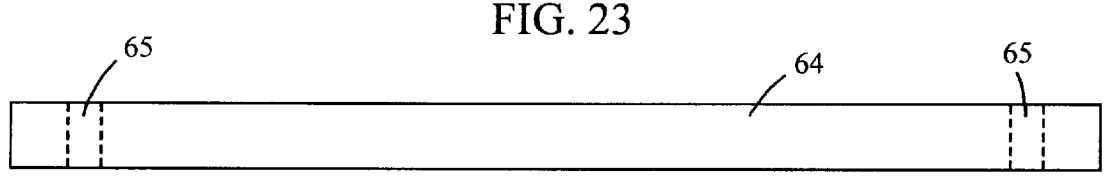

Now referring to FIGS. 16–21B, various views of front and rear fence feet soles 57, 58 are shown. The lower front edges of both the front and rear fence feet soles 57, 58 have rabbets 61 to minimize any swarf build-up problems that may occur during their use. As shown in FIG. 19, the front fence foot sole 57 has a notch 62 on its forward side to provide clearance for the router bit when the front fence foot 27 is set at the fully forward position, as described earlier.

Figure 28:
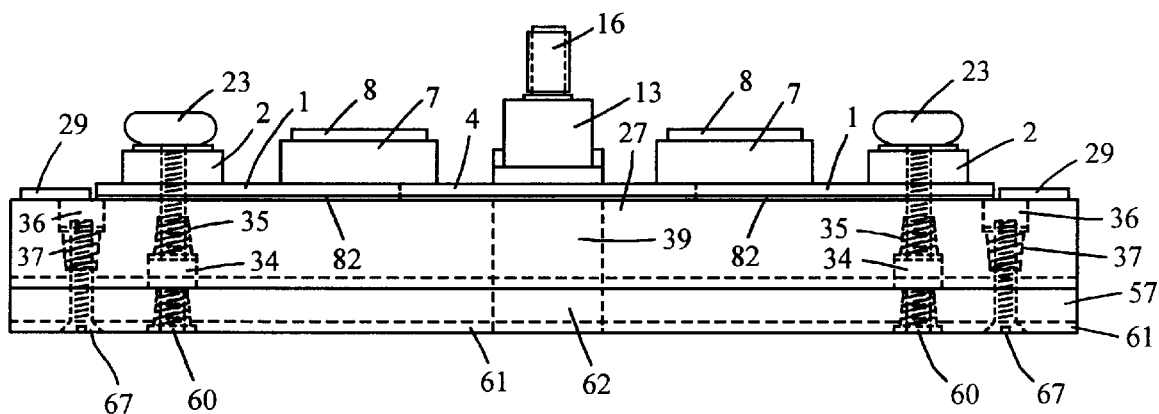
FIGS. 28 and 29 show a front view and end view, respectively, of the apparatus with soles attached to its fence feet.
Figure 29:
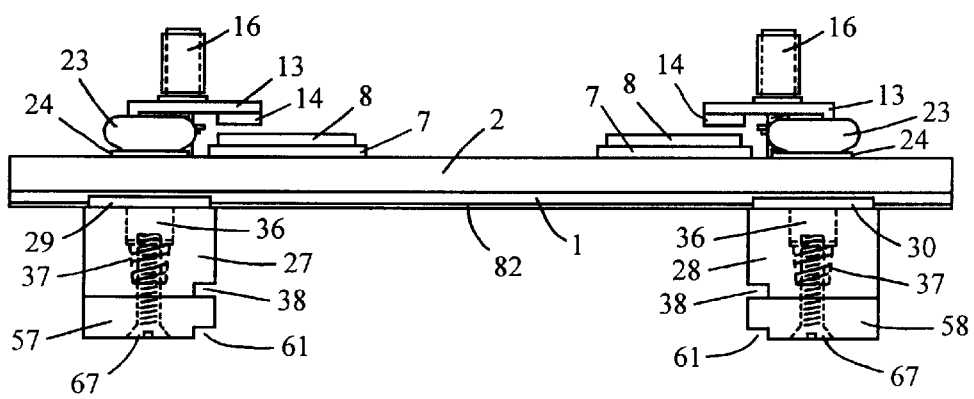

Located underneath at each end of the front and rear fence feet soles 57, 58 are countersunk holes 59, which are used when the fence feet soles 57, 58 are attached to the undersides of the fence feet 27, 28. The fence feet soles 57, 58 are attached to the fence feet 27, 28 by means of flat-headed stove bolts 67, which screw into the flanged threaded metal inserts 37, as shown in FIGS. 28 and 29.

Figure 34:
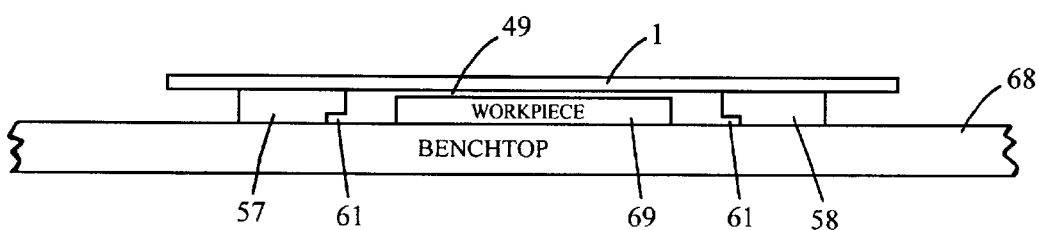
Figure 35A:
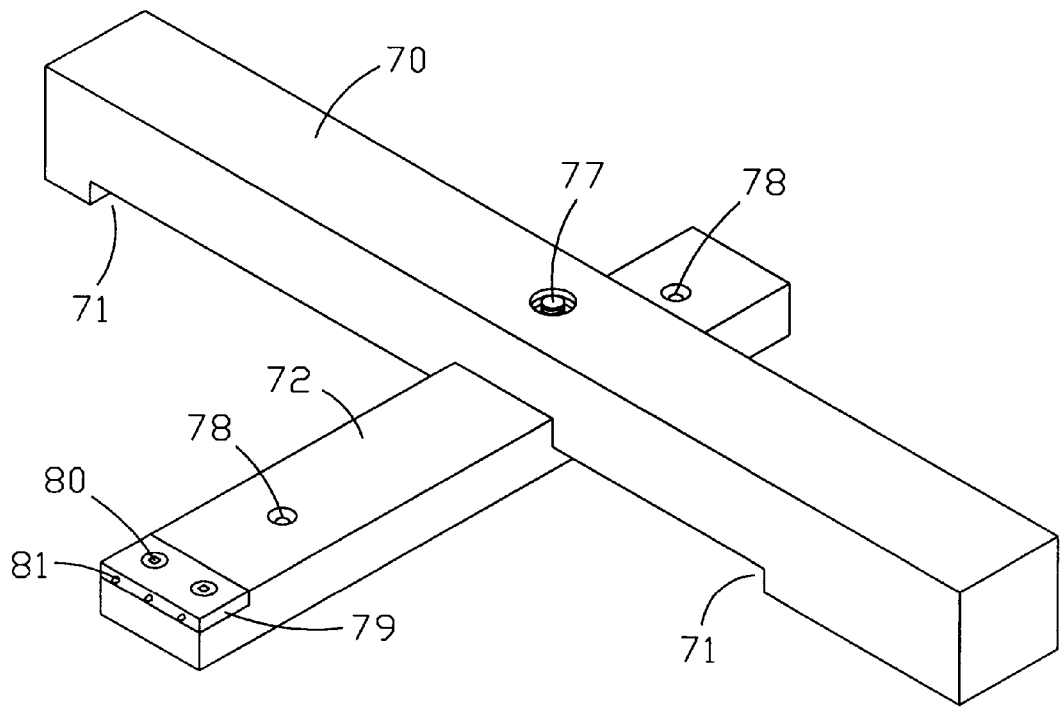
FIG. 35A shows an isometric view of an end holding clamp unit in a cross configuration.
Figure 35B:
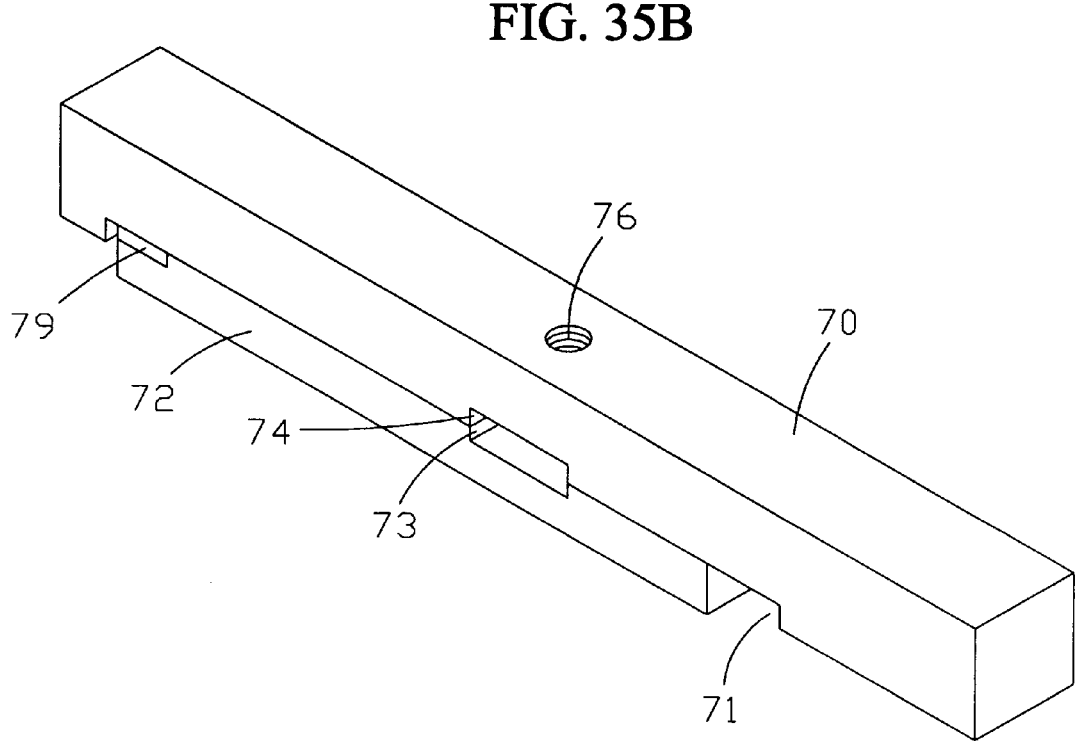
FIG. 35B shows an isometric view of the end holding clamp unit of FIG. 35A folded for storage.
Figure 36A:
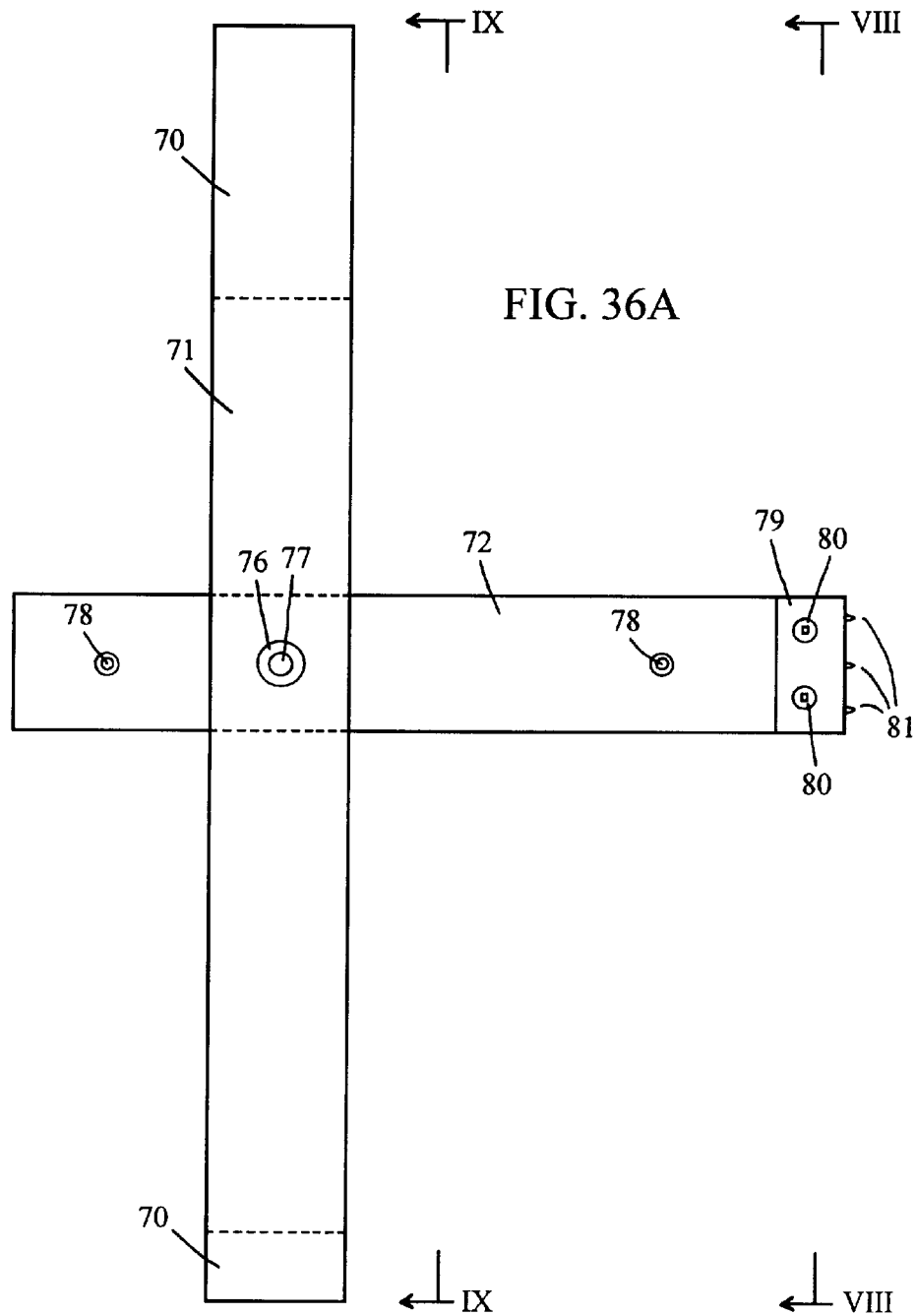
FIGS. 36A, 36B and 37 show a top view, side view, and end view, respectively, of the end holding clamp unit shown in FIG. 35A.
Figure 36B:
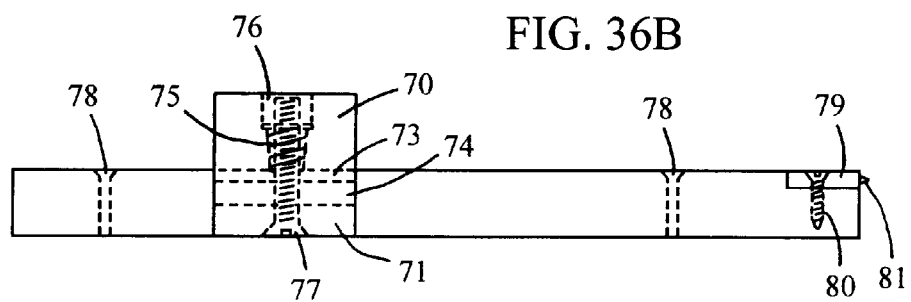
Figure 37:
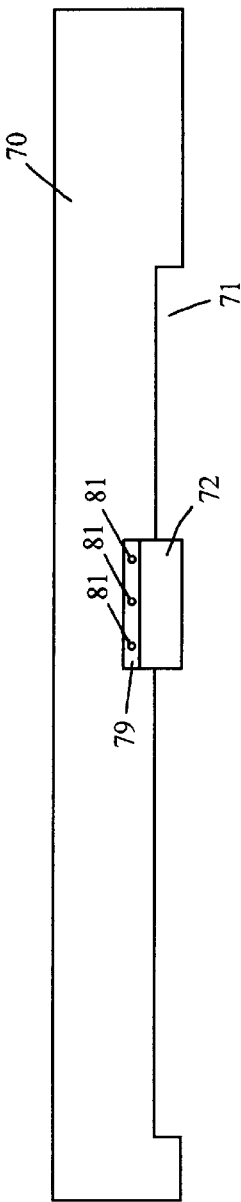
Figure 38:
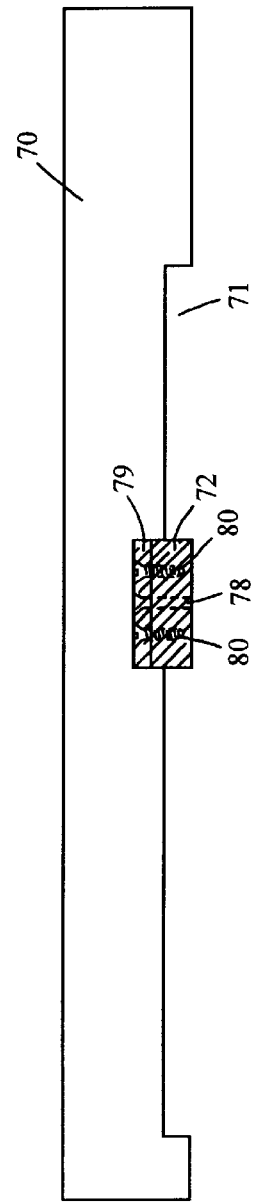
FIG. 38 shows a cross-sectional end view of the end holding clamp unit taken along the line VIII—VIII indicated in FIG. 36A.
Figure 39:
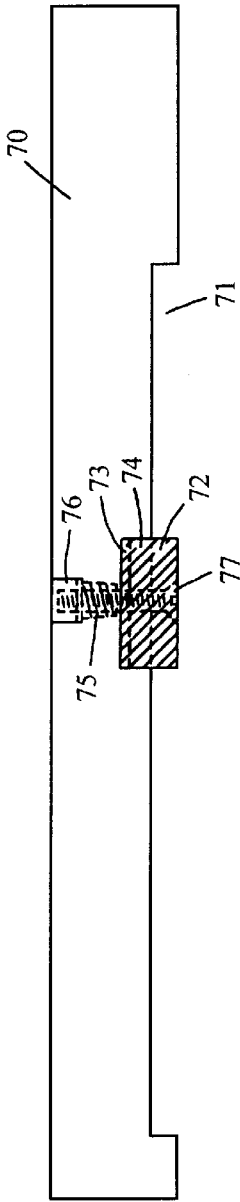
FIG. 39 shows a cross-sectional end view of the end holding clamp unit taken along the line IX—IX also indicated in FIG. 36A.

Still referring to FIGS. 16–21B, located underneath, near each end of the front and rear fence feet soles 57, 58 are flanged threaded metal inserts 60, which are used when the fence feet soles 57, 58 are attached directly onto the main body platform 1, in place of the fence feet 27, 28. As the fence feet soles have a thickness of ½", this will provide a lower operational height for the main body platform 1, as shown in FIG. 34.

Figure 25:
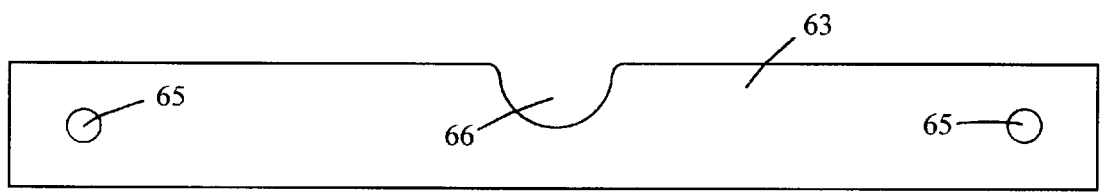
FIGS. 25, 26 and 27 show a top view, front view, and end view, respectively, of a fence foot spacer variant.
Figure 26:
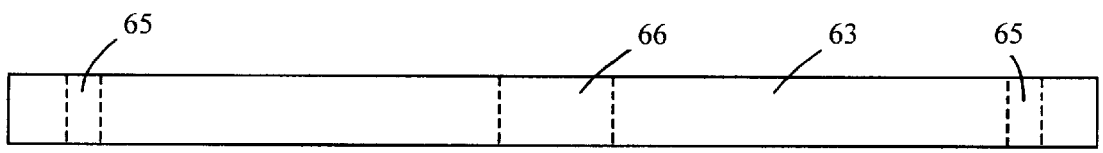
Figure 24:
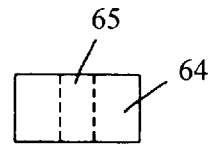
Figure 27:
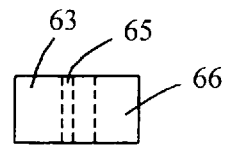
Figure 30:
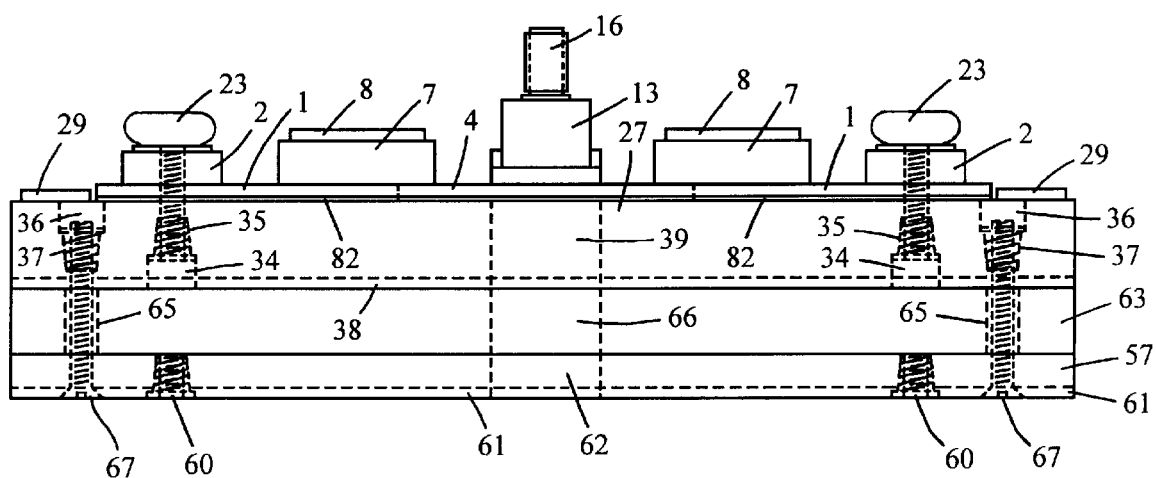
FIGS. 30 and 31 show a front view and end view, respectively, of the apparatus with fence feet spacers to raise the apparatus higher.
Figure 31:
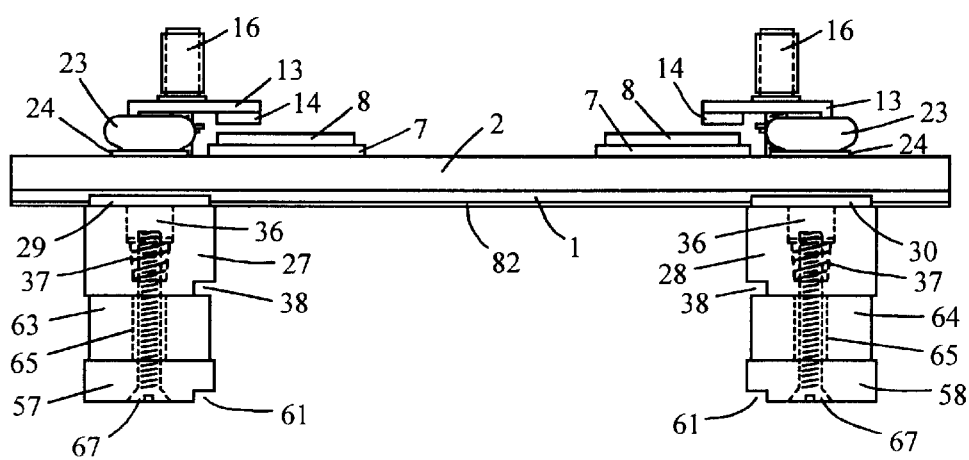

Now referring to FIGS. 22–27, fence feet spacers 63, 64 are used when the operational height of the main body platform 1 needs to be greater than 1½" (i.e. greater than the height of the fence feet 27, 28 with fence feet soles 57, 58 attached). As shown in FIG. 25, the front fence foot spacer 63 has a notch 66 on its forward side to provide clearance for the router bit when the front fence foot 27 is set at its fully forward position, as described earlier. The fence feet spacers 63, 64 are placed in between the fence feet and fence feet soles, as shown in FIGS. 30 and 31.

Still referring to FIGS. 22–27, located near each end of the front and rear fence feet spacers 63, 64 are clearance holes 65. Flat-headed stove bolts 67 will pass through these clearance holes 65 when the fence feet soles 57, 58 are fastened onto the fence feet 27, 28 with the fence feet spacers 63, 64 sandwiched in between them.

The set of fence feet spacers 63, 64 shown in FIGS. 22–27, would have various thicknesses, which can be used as individual pairs, or in any combination of pairs. This will provide a complete range of operational heights for the main body platform 1 and allow a minimum amount of clearance to be achieved between the main body platform 1 and the top of the workpiece, when the millguide is being used in either the second or third mode.

Referring now to FIGS. 28–31, flanged threaded metal inserts 37 are located in deep recesses 36 in the tops of the front and rear fence feet 27, 28. Because of this, only a few different lengths of flat-headed stove bolts 67 will be required to accommodate all of the combinations that are necessary to provide the complete range of operational heights for the main body platform 1.

When the millguide is operated in the second mode, the workpiece is first clamped in the jaws of a portable workbench, such as a Black & Decker Workmate™, at an appropriate height, so that the top surface of the workpiece will be close to but not touching the underside of the main body platform, when the millguide is placed on top of the jaws of the portable workbench. In this mode, the fence feet 27, 28 are used as both fences and feet, or as feet only. The top of the Workmate™ jaws act as the reference surface for the millguide. Therefore, the workpiece will have to be clamped at an appropriate angle in the Workmate™ jaws, because any routing that is done on the workpiece will be parallel to the top surface of the jaws. Workpieces can be mounted either horizontally or vertically, or at any other angle, in the Workmate™ jaws. However, no routing work can be done beyond each end of the jaws because there would then be no reference surface for the millguide fence feet. As discussed earlier, the main body platform of the millguide can be raised or lowered from its normal operating height by means of the fence feet soles and spacers. The limitations identified when the millguide is operating in the first mode are not present in the second mode. Specifically, temporary ⅛" wide reference walls are not necessary since the millguide uses the top of the Workmate™ as the reference surface and hence, rabbets can be cut to the edge of the workpiece. Since the top surface of the Workmate™ jaws should be flat and true, a twist or warp on the original top surface of the workpiece can be easily removed by router-planing using the millguide in the second mode.

When the millguide is operated in the third mode, the workpiece must be fastened down in some way on the benchtop surface such that there are no obstructions on the top or sides of the workpiece. This can be done either by nailing or screwing the workpiece down, or by using a temporary kind of glue. An alternate method is to use clamp units to hold the ends of the workpiece, as explained below.

Referring to FIGS. 35A–39, a clamp unit body 70 has a long recessed area 71 on its underside, which minimizes any problems that may occur due to swarf build-up. A cross arm 72 is attached to the clamp unit body 70 by means of a single flat-headed stove bolt 77. A lap joint recess 74 is located inside the long recessed area 71 of the clamp unit body 70, and matches up with a similar lap joint recess 73 located on the top surface of the cross arm 72. The two lap joint recesses 73, 74 fit together, which ensures that the cross arm 73 is held rigidly at right-angles to the clamp unit body 70. Buried in a deep recess 76, in the upper surface of the clamp unit body 70, is a flanged threaded metal insert 75 that the flat-headed stove bolt 77 is screwed into, when the clamp unit body 70 and cross arm 72 are fastened together.

Recessed onto the longer end of the cross arm 72 is a spike mounting block 79 which is fastened onto the cross arm 72 by means of flat-headed wood screws 80. Spiked tips 81 are secured by their insertion into press fit holes that are drilled into the spike mounting block 79.

Countersunk holes 78 located in the cross arm 72 are provided so that the end holding clamp unit can be screwed down to a benchtop, if desired.

Figure 40:
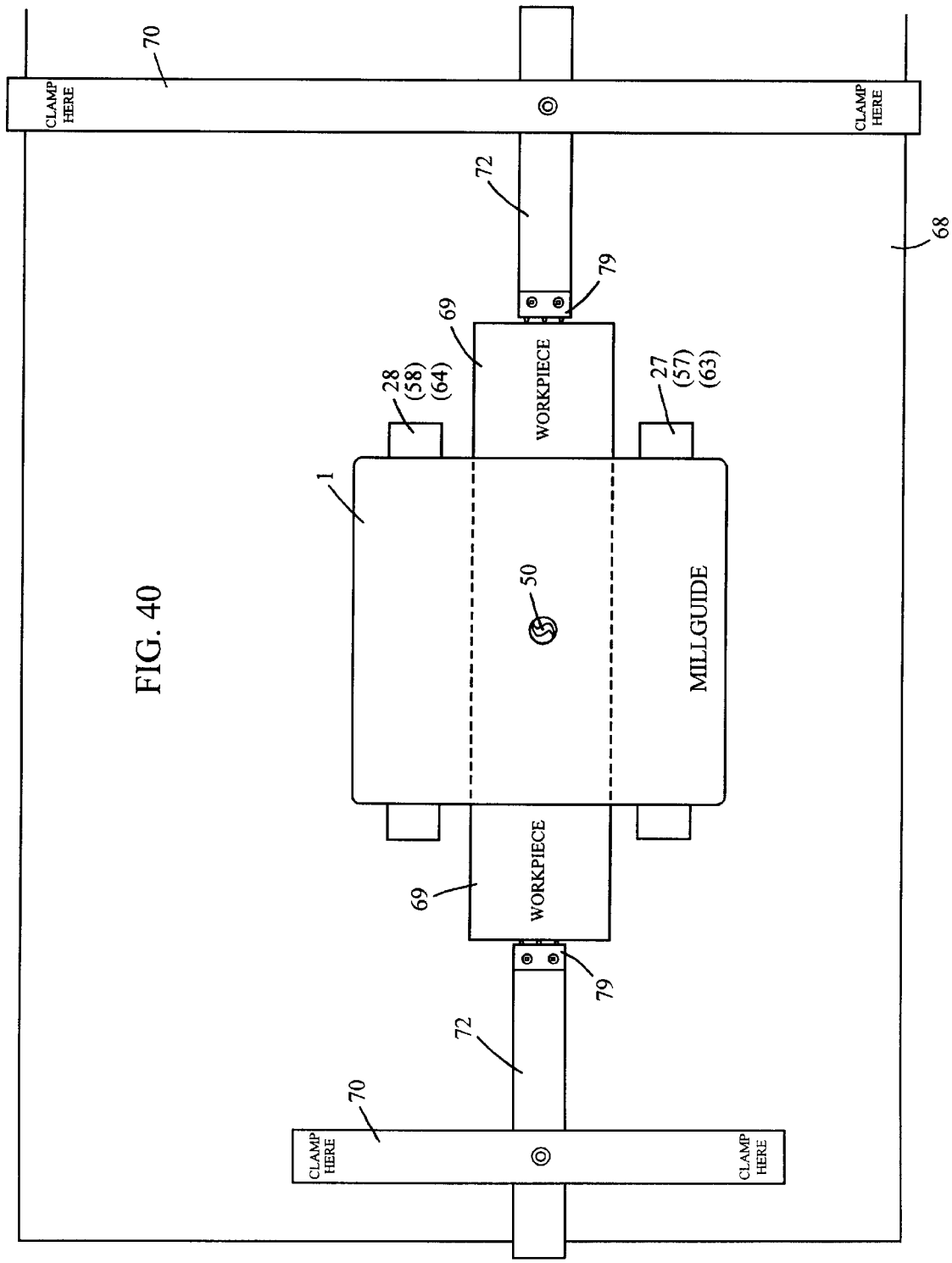
FIG. 40 shows a top view of the apparatus being used on a benchtop with the workpiece being held by two end holding clamp units.
Figure 41:
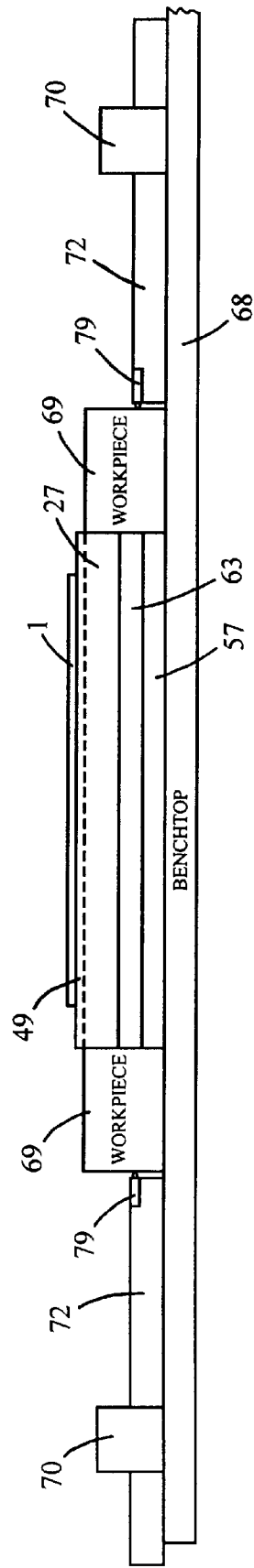
FIG. 41 shows a corresponding front view of the setup shown in FIG. 40.

Now referring to FIGS. 40 and 41, a typical setup shows how the end holding clamp units are used for securely holding a workpiece 69 onto a benchtop 68. If the workpiece 69 is warped and does not lie flat on top of the benchtop 68, then shims should be placed under the workpiece at opposite corners to stop the workpiece from rocking. The spiked tips 81 are conical in shape for maximum holding power, even when only partly inserted into the ends of a workpiece. It is not necessary that they have to be fully inserted, and the forward ends of the cross arms 72 do not necessarily butt up against the workpiece 69. It is advantageous if the body 70 of one of the end holding clamp units has been clamped down in its required location first, before the workpiece 69 and then the other end holding clamp unit is installed. The clamp unit bodies 70 can be clamped down using either C-clamps or bar clamps. The locations where the clamp unit bodies 70 should be clamped are indicated by the words "clamp here" as shown in FIG. 40.

Still referring to FIG. 40, the clamp unit body 70 of the left end holding clamp unit can be relatively short because the ends of it can be easily clamped down when it is positioned at one end of the benchtop 68. The clamp unit body 70 of the right end holding clamp unit is made long enough to span the full width of the benchtop 68. This enables the right end holding clamp unit to be positioned at any location along the length of the benchtop 68 to accommodate various lengths of workpieces 69, and still be able to have both of its ends clamped down to the benchtop 68.

The longer end of each cross arm 72 is made a specific length so that each clamp unit body 70 will also act as an end stop for the millguide. This enables the router bit 50 to cut as close as possible to both ends of the workpiece 69 while ensuring that even the largest diameter blades are prevented from colliding with the spike mounting blocks 79. Consequently, there will be small unrouted areas at each end of the workpiece. These small unrouted areas can easily be chiselled out, or removed with a saw, afterwards.

Now referring to FIGS. 42–45, when the end holding clamp units are not in use, they can be conveniently folded up for storage. This is done by simply loosening the flat-headed stove bolt 77 a sufficient amount to enable the lap joint recesses 73, 74 to separate, so that the cross arm 72 can be swung until it is parallel with the clamp unit body 70. The flatheaded stove bolt 77 is then tightened to lock the cross arm 72 in that position.

Figure 46:
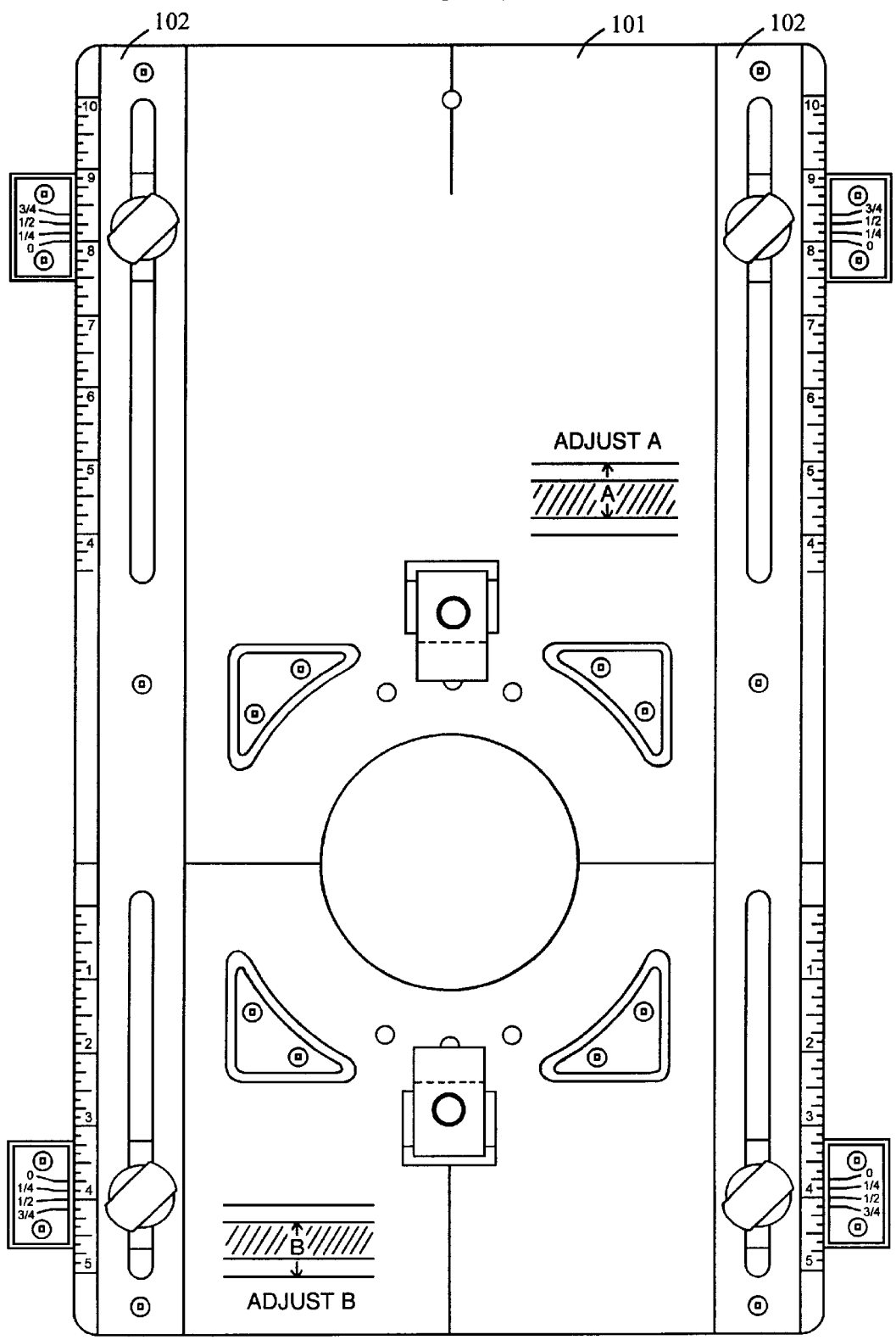
FIG. 46 shows a larger variant of the millguide.

Now referring to FIG. 46, a larger version of the millguide is shown. The larger version of the millguide is essentially identical to the standard version in every way except that the main body platform 101, and the fence foot adjustment bars 102, are made longer.

In order to avoid an excessively lengthy main body platform 101, the larger version millguide shown in FIG. 45 has a rear platform area which is made longer than the front platform area. With this design, the front fence foot sets the B dimension so that routing can be done on the workpiece that is up to about 5" from the front edge of the workpiece. The rear fence foot sets the A dimension so that routing can be done on the workpiece that is between about 4" to 10" away from the rear edge of the workpiece. Consequently, this larger version of the millguide would be used in the normal direction, as shown earlier in FIG. 15, for any routing work that is to be done on the front half of a board which is say 10" wide. The millguide, or the workpiece, is then turned back to front for any work that is to be done on the rear half of the 10" wide board.

Four modes of operating the millguide have been described above. In summary, the main advantage of using the millguide in the first mode is the unlimited length possible for any routing work that can be done on a workpiece, when the millguide is used directly on the workpiece. In the second mode, the main advantage is the convenience and simplicity of operation when a workpiece is clamped between the jaws of a portable workbench, such as a Workmate™, and also that the workpiece can be clamped at any angle. The main advantage of the third mode is that the workpieces can be longer and wider than in the second mode, when fastened onto the top of a benchtop, and that benchtop can be used to provide a reference surface. In the fourth mode, as explained earlier, the advantage is that the main body platform 1 can be used as an oversized baseplate for the router, thus enabling the router to span large recessed areas on a workpiece. The larger version of the millguide can be used in mode one or mode three, and possibly mode four. However, in certain cases, the fence feet may be spaced too far apart for the larger version of the millguide to be used in mode two.

While the particular embodiment of the present invention has been illustrated and described, it would be obvious to those skilled in the art that various changes and modifications can be made without departing from the spirit and scope of the invention. It is therefore intended to cover in the following claims all of such changes and modifications that are within the scope of this invention.

I claim:

1. An apparatus for use with a router, said router having a baseplate and a router bit extending downwardly from said baseplate for routing a workpiece, said apparatus comprising:
    (a) a main body platform having location means for receiving and locating the router baseplate therein, said main body platform having a centrally located access hole for the router bit and opposite side edges;
    (b) a pair of fence feet located on the underside of said main body platform on either side of the access hole and substantially parallel to one another, said pair of fence feet providing opposing inside surfaces for limiting lateral movement of said main body platform relative to the workpiece, each of the fence feet having first and second ends extending beyond the opposite side edges of the body platform and including first and second surface areas viewable from above;
    (c) calibration reference points on at least one of the first and second surface areas thereon;
    (d) mounting and securing means slidably mounting the fence feet to the main body platform for movement in a direction generally perpendicular to the fence feet and enabling the fence feet to be secured to the main body platform; and
    (e) calibration markings marked on said main body platform along the opposite side edges for use in conjunction with the calibration reference points, wherein the calibration reference points enable an allowance to be made for the diameter of a router bit.

2. An apparatus as claimed in claim 1, wherein the mounting and securing means comprises, for each fencefoot, a pair of elongate slots in the main body platform and a pair of screw knobs each having a screw shaft extending through one of the slots and engaging the fencefoot.

3. An apparatus as claimed in claim 2, wherein the main body platform includes a pair of substantially parallel fence feet adjustment bars mounted parallel to and set in from the opposite side edges thereof, with the elongate slots being provided in the fencefoot adjustment bars.

4. An apparatus as claimed in claim 2, wherein the location means comprises a plurality of curve-shaped holding blocks fastened to the top of said main body platform, the holding blocks being positioned a uniform radial distance from the central access hole.

5. An apparatus as claimed in claim 4, further including holding clamps for securing the router baseplate to the main body platform, the holding clamps being mounted on said main body platform and, in use, extending over opposite sides of the baseplate to secure said baseplate to the main body platform.

6. An apparatus as claimed in claim 1, wherein at least one of said fence feet has a notch located on its forward side so as to provide clearance for said router bit when said one of said fence feet is set to its fully forward position.

7. An apparatus as claimed in claim 1, wherein one of said main body platform and said baseplate includes a plurality of holes for accepting locating lugs protruding from the other of said main body platform and said baseplate for positioning the baseplate at a specific angular orientation.

8. An apparatus as claimed in claim 1, further including pairs of height-extending fence feet soles for incrementally raising the overall height of the fence feet for spacing the main body platform at a greater height above a bench top, and optionally including pairs of spacers for further increasing the height of the fence feet.

9. An apparatus as claimed in claim 2, further in combination with a pair of end-holding clamp units for holding a workpiece in position on a planar surface, each end-holding clamp unit comprising a clamp unit body for clamping to a workbench and a spike means at an end thereof for engaging a workpiece.

10. An apparatus as claimed in claim 9, wherein, for each end holding clamp unit, the clamp unit body has a substantially rectangular parallelepiped shape, said clamp unit body and has a first lap joint recess substantially at a mid-point along the bottom side thereof, and wherein each clamp unit includes:
    a cross arm having a flat rectangular parallelepiped shape and a second lap joint recess along the top side of said cross arm; and
    a spike mounting block, said spike mounting block being fastened to one end of said cross arm, said spike mounting block having a plurality of spiked tips projecting outwardly,
    wherein said cross arm and said clamp unit body are joined together at said first and second lap joint recesses so that said cross arm is perpendicular to said clamp unit body.

11. An apparatus as claimed in claim 2, wherein the main body platform has front and rear edges extending between the opposite side edges and wherein the access hole is offset towards the front of the main body platform, and wherein the fencefoot adjacent the rear edge of the main body platform is provided with longer slots for adjustment thereof.

12. An apparatus as claimed in claim 2, wherein at least one of the fence feet includes a central notch on the side adjacent to the access hole, for accommodating a router bit, for routing material from the edge of a workpiece.

13. An apparatus for use with a router, said router having a baseplate and a router bit extending downwardly from said baseplate for routing a workpiece, said apparatus comprising:
   (a) a main body platform having location means for receiving and locating the router baseplate therein, said main body platform having a centrally located access hole for the router bit and opposite side edges;
   (b) a pair of fence feet located on the underside of the main body platform on either side of the access hole and substantially parallel to one another, said pair of fence feet providing opposing inside surfaces for limiting lateral movement of said main body platform relative to the workpiece;
   (c) mounting and securing means slidably mounting the fence feet to the main body platform for movement in the direction generally perpendicular to the fence feet and enabling the fence feet to be secured to the main body platform; and
   (d) means for adjusting the vertical height of the fence feet comprising at least one of fence feet soles securable to the bottom of the fence feet and pairs of spacers of different heights for adjusting the height of the fence feet.

14. An apparatus for use with a router, said router having a baseplate and a router bit extending downwardly from the baseplate for routing a workpiece, the apparatus comprising:
   (a) a main body platform having location means for receiving and locating the router baseplate therein, the main body platform having an access hole for the router bit, opposite side edges and front and rear edges, wherein the access hole is located closer to the front edge than the rear edge;
   (b) a pair of fence feet located on the underside of the main body platform on either side of the access hole and substantially parallel to one another, said pair of fence feet providing opposing inside surfaces for limiting lateral movement of said main body platform relative to the workpiece;
   (c) mounting and securing means slidably mounting the fence feet to the main body platform for movement in a direction generally perpendicular to the fence feet and for enabling the fence feet to be secured to the main body platform, the mounting and securing means providing a greater range of movement for the rear fence foot, relative to the front fence foot.

15. A method of routing a surface of a workpiece with a router having a baseplate and a router bit extending downwardly from the baseplate, the method comprising:
   (1) providing an apparatus comprising:
      (a) a main body platform having location means for receiving and locating the router baseplate therein, said main body platform having a centrally located access hole for the router bit and opposite side edges;
      (b) a pair of fence feet located on the underside of the main body platform on either side of the access hole and substantially parallel to one another; and
      (c) mounting and securing means slidably mounting the fence feet to the main body platform for movement in the direction generally perpendicular to the fence feet and enabling the fence feet to be secured to the main body platform;
   (2) mounting a router to the main body platform, and adjusting and securing the fence feet in desired positions;
   (3) mounting the workpiece onto a workbench;
   (4) supporting the router by the fence feet on the workbench; and
   (5) operating the router and traversing the router and the apparatus across the workbench to rout the workpiece.

16. A method as claimed in claim 15, wherein the fence feet are set far enough apart to permit the whole surface of the workpiece to be covered by the router, and wherein the router is operated to effect a planing operation on the surface of the workpiece.

17. A method as claimed in claim 15, wherein the fence feet are adjusted to a desired spacing, and the router is operated to effect one of cutting a groove and cutting a rabbet on the workpiece.

18. A method as claimed in claim 15, wherein the workpiece is held onto the workbench by one of:
   (1) securing the workpiece with clamp units and clamping the clamp units to the workbench;
   (2) mounting the workpiece in a workbench having two opposed and movable jaws, between which the workpiece is clamped, and the jaws providing a surface for supporting the fence feet.

19. A method of routing a surface of a workpiece, having generally parallel and uniformly spaced sides, with a router having a baseplate and a router bit extending downwardly from the baseplate, the method comprising:
   (1) providing an apparatus comprising:
      (a) a main body platform having location means for receiving and locating the router baseplate therein, said main body platform having a centrally located access hole for the router bit and opposite side edges;
      (b) a pair of fence feet located on the underside of the main body platform on either side of the access hole and substantially parallel to one another; and
      (c) mounting and securing means slidably mounting the fence feet to the main body platform for movement in the direction generally perpendicular to the fence feet and enabling the fence feet to be secured to the main body platform;
   (2) mounting a router to the main body platform;
   (3) adjusting the fence feet relative to the width of the workpiece between the sides thereof so that the spacing between an inside surface of each fence foot and the most distant edge of the router bit is less than the width of the workpiece, to maintain the router bit on the workpiece; and
   (4) mounting the apparatus on the workpiece, operating the router and traversing the router across the workpiece, as limited by the fence feet, to cut a groove in the workpiece.

20. A method as claimed in claim 19, wherein the fence feet are adjusted to leave relatively narrow side walls on either side of the workpiece, wherein the router bit is adjusted, to make successive cuts into the workpiece, and wherein once the surface of the workpiece has been cut down to a desired level by the router, the remaining, narrow side walls are removed by planing.

* * * * *